US009031000B2

(12) United States Patent
Morimoto et al.

(10) Patent No.: US 9,031,000 B2
(45) Date of Patent: May 12, 2015

(54) COMMUNICATION TERMINAL, CONTROL DEVICE, AND BASE STATION

(75) Inventors: Tetsuro Morimoto, Kanagawa (JP); Takashi Aramaki, Osaka (JP); Hiroyuki Ehara, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 13/614,507

(22) Filed: Sep. 13, 2012

(65) Prior Publication Data

US 2013/0010961 A1    Jan. 10, 2013

Related U.S. Application Data

(63) Continuation of application No. 12/438,480, filed as application No. PCT/JP2007/066416 on Aug. 24, 2007, now Pat. No. 8,289,924.

(30) Foreign Application Priority Data

Aug. 24, 2006    (JP) .................. 2006-228348
Oct. 30, 2006    (JP) .................. 2006-294475
Jan. 18, 2007    (JP) .................. 2007-009331

(51) Int. Cl.
*H04W 4/00*    (2009.01)
*H04W 76/02*    (2009.01)
*H04W 80/04*    (2009.01)
*H04W 88/04*    (2009.01)

(52) U.S. Cl.
CPC ............ *H04W 76/022* (2013.01); *H04W 80/04* (2013.01); *H04W 88/04* (2013.01)

(58) Field of Classification Search
USPC .............. 370/328; 713/151, 153; 726/1, 13, 2
See application file for complete search history.

(56) References Cited

U.S. PATENT DOCUMENTS 5,931,964 A    8/1999 Beming
6,757,270 B1   6/2004 Kumar
(Continued)

FOREIGN PATENT DOCUMENTS

JP    2002-094446    3/2002
JP    2003-241799    8/2003
(Continued)

OTHER PUBLICATIONS

International Search Report dated Nov. 20, 2007.
(Continued)

*Primary Examiner* — Phuongchau Ba Nguyen
(74) *Attorney, Agent, or Firm* — Dickinson Wright PLLC

(57) ABSTRACT

A transmitting side UE1 and a receiving side UE2 are both connected to a given E-Node B. The transmitting side UE1 divides a transmission packet addressed to UE2 into a first packet to be transmitted via a route not passing through a given access gateway and a second packet to be transmitted via a route passing through the given access gateway, and the packets are transmitted to the given E-Node B. The E-Node B transmits the first packet to UE2 and also transmits the second packet to the access gateway. The access gateway receives the second packet and transmits it to the E-Node B. The E-Node B receives the second packet transmitted from the access gateway and transmits it to UE2. UE2 receives the first packet and the second packet and synthesizes them to restore the initial packet.

14 Claims, 25 Drawing Sheets

(56) References Cited

U.S. PATENT DOCUMENTS

| | | | |
|---|---|---|---|
| 7,418,273 | B2 | 8/2008 | Tomoe |
| 7,697,420 | B1 * | 4/2010 | Garahi et al. ............ 370/229 |
| 7,924,798 | B1 * | 4/2011 | Brown et al. ............ 370/341 |
| 2003/0007467 | A1 | 1/2003 | Sawada |
| 2004/0029602 | A1 | 2/2004 | Kunihiro |
| 2005/0032517 | A1 | 2/2005 | Chng |
| 2005/0083924 | A1 | 4/2005 | Dillinger |
| 2005/0118997 | A1 | 6/2005 | Wu |
| 2006/0217119 | A1 | 9/2006 | Bosch |
| 2007/0206538 | A1 | 9/2007 | Mizukoshi |
| 2007/0230413 | A1 | 10/2007 | Gandhi |
| 2013/0010961 | A1 * | 1/2013 | Morimoto et al. ............ 380/270 |

FOREIGN PATENT DOCUMENTS

| | | |
|---|---|---|
| JP | 2004-007457 | 1/2004 |
| JP | 2006-157454 | 6/2006 |
| JP | 2006-211614 | 8/2006 |
| JP | 2007-235827 | 9/2007 |
| WO | 2006/075274 | 7/2006 |

OTHER PUBLICATIONS

3GPP TR 23.882 draftV1.1.0 (Apr. 2006), Technical Report, 3rd Generation Partnership Project; Technical Specification Group Services and System Aspects; 3GPP System Architecture Evolution: Report on Technical Options and Conclusions (Release 7), Apr. 2004, pp. 1-120.

3GPP TR 25.813 V0.9.2 (May 2006), Technical Report, 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7), May 2005, pp. 1-39.

T. Mori, et al., "Wideband Speech coding Robust against Packet Loss," D-II, vol. J88-D-II, No. 7, Jul. 2005, pp. 1103-1113.

* cited by examiner

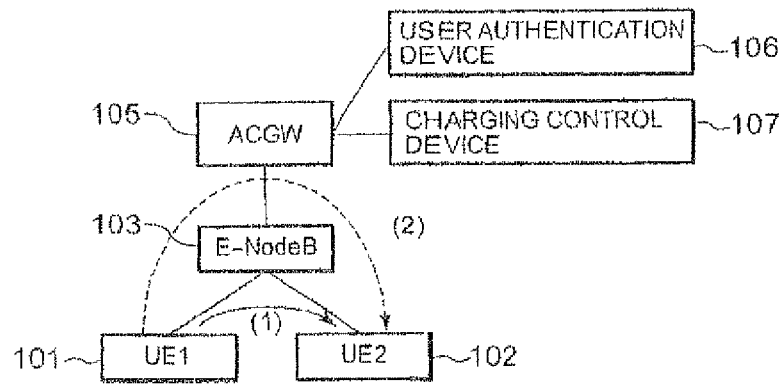
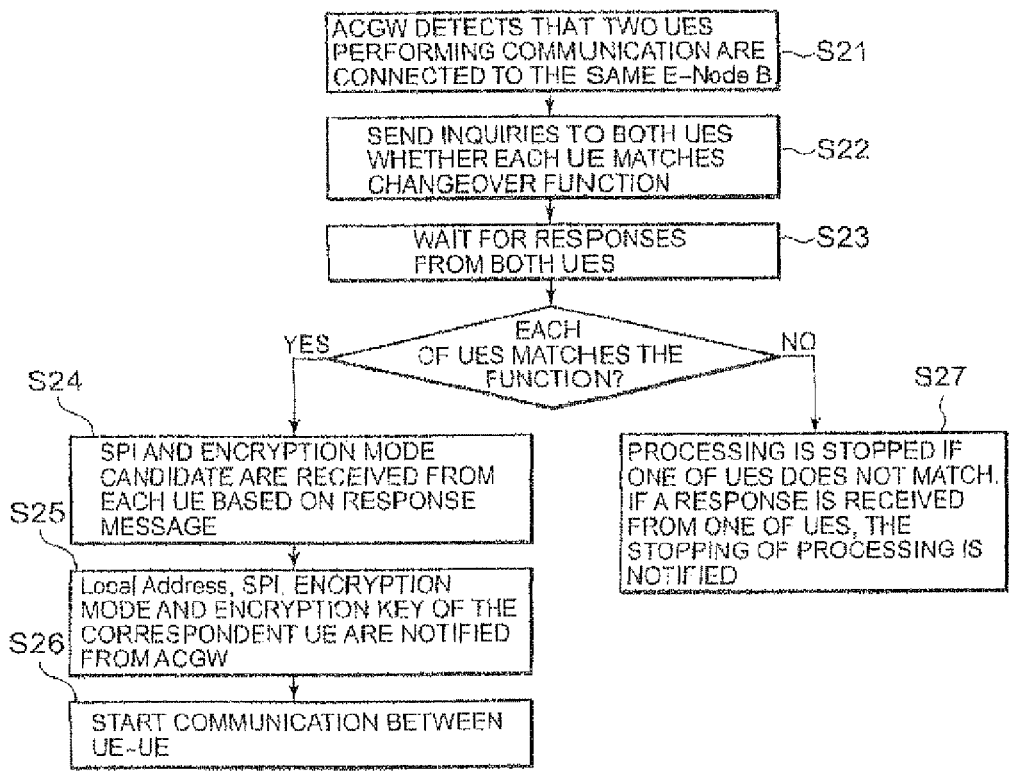

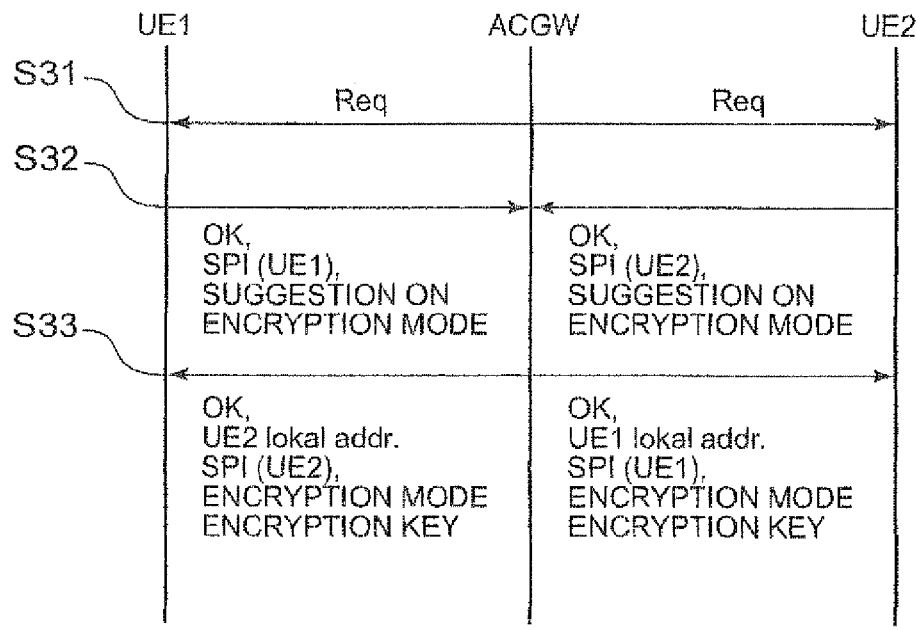
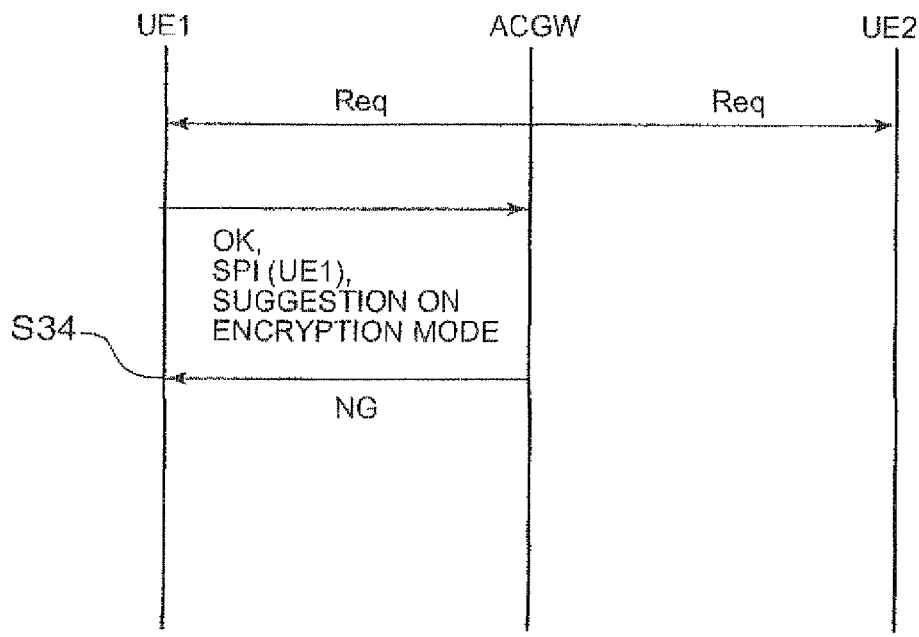

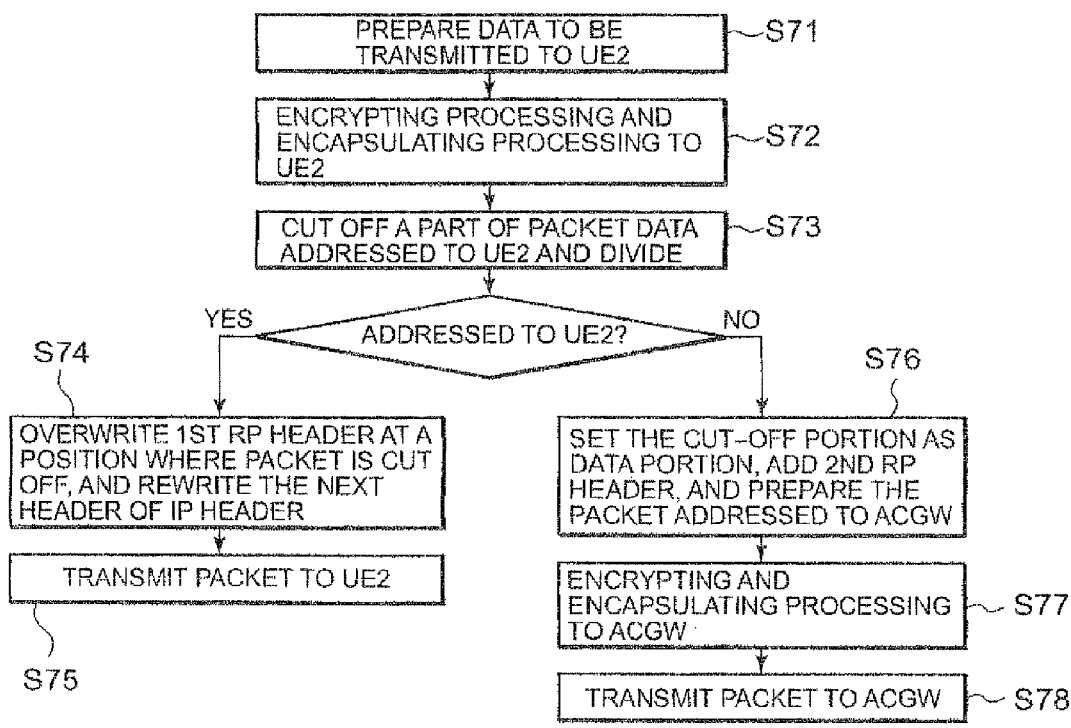
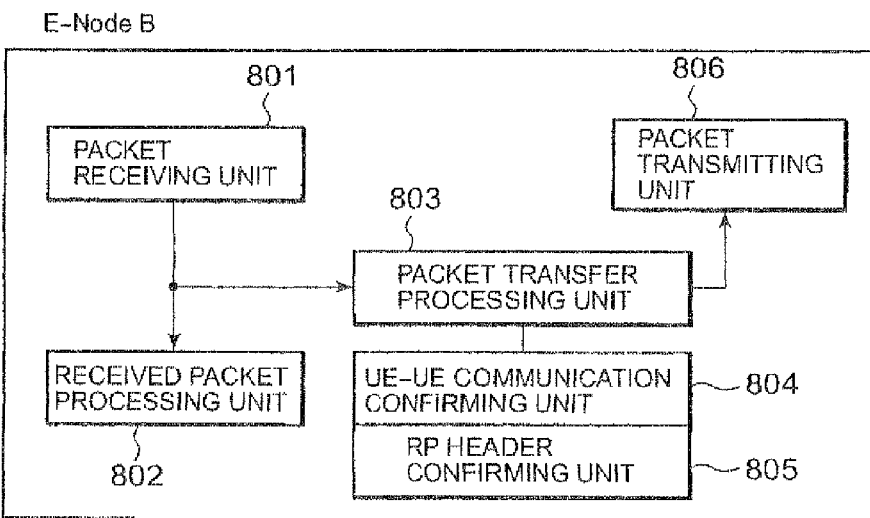

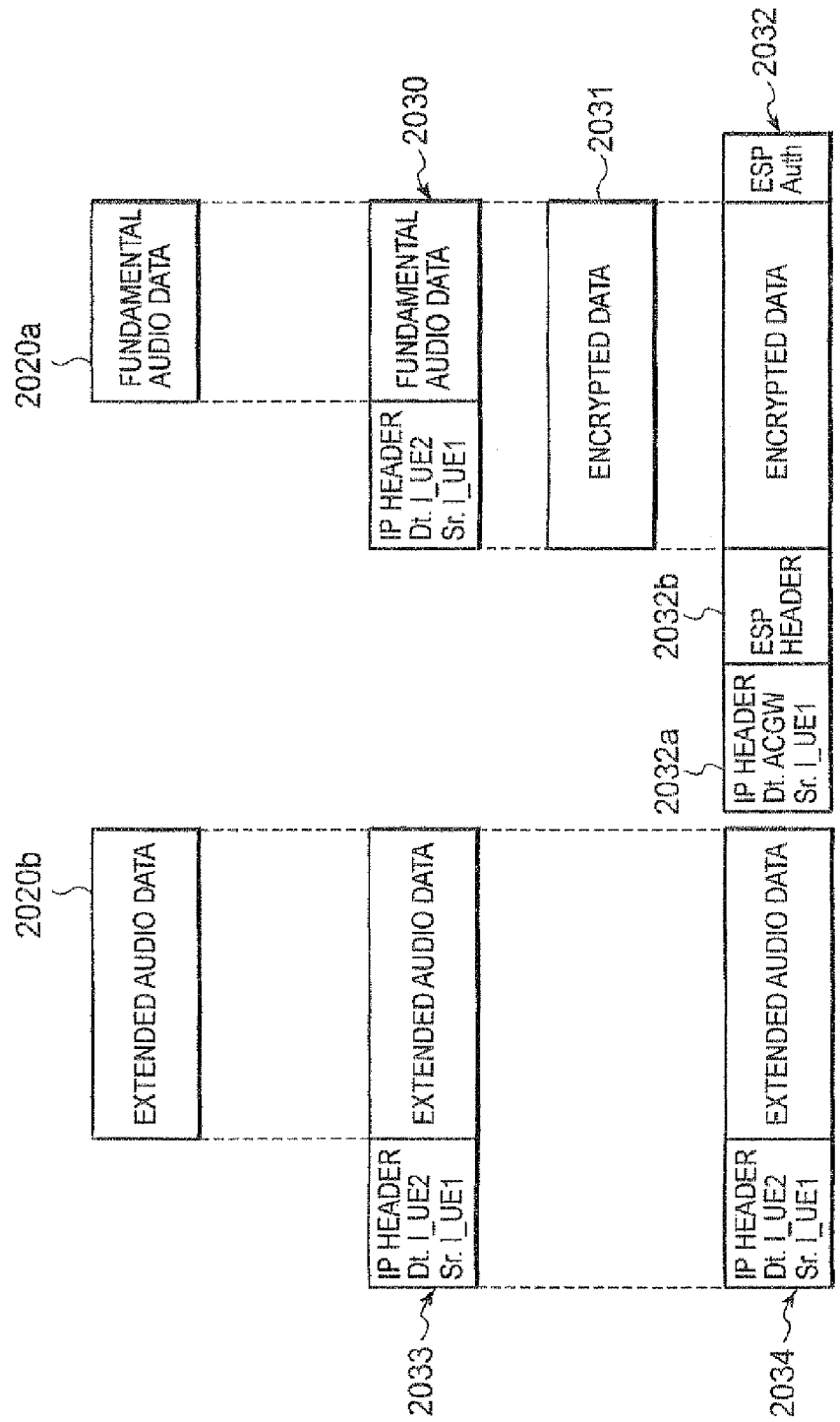

COMMUNICATION TERMINAL, CONTROL DEVICE, AND BASE STATION

This is a continuation application of application Ser. No. 12/438,480 filed Feb. 23, 2009, which is a national stage of PCT/JP2007/066416 filed Aug. 24, 2007, which is based on Japanese patent application no. 2006-228348 filed on Aug. 24, 2006, Japanese application no. 2006-294475 filed Oct. 30, 2006, and Japanese application no. 2007-009331 filed Jan. 18, 2007, the entire contents of each of which are incorporated by reference herein.

TECHNICAL FIELD

The present invention relates to a communication system using a packet network, a communication method, a radio terminal, a radio relay device, and a control device.

BACKGROUND ART

As described in the Non-Patent Documents 1 and 2 as given below, an architecture shown in FIG. 15 is proposed as a configuration of the next generation network of 3rd Generation Partnership Project (3GPP; registered trademark). In FIG. 15, user equipments (hereinafter referred as "UE" or "UEs") UE 101 and UE 102 are connected to base stations E-Nodes B (Evolved Nodes 13) 103 and 104 respectively via radio wave. Further, the base stations 103 and 104 are connected to access gateway (ACGW; or MME/UPE) 105, which is a control device on network side and connected via wired means. ACGW 105 performs user authentication processing by using a user authentication device 106, and it is judged whether UE 101 and UE 102 should be connected to the network or not. Also, by using a charging control device 107, various types of information including the conditions of use such as the amount of packets for charging the fees to UE 101 and UE 102 (PCRF; Policy Control and Charging Rules Function) are collected. Also, the data of user plane is encrypted between ACGW 105 on one side and UE 101 and UE 102 on the other side respectively.

First, description will be given on a flow of packets between UE 101 and UE 102. The transmitting side UE 101 generates packets to be transmitted to the receiving side UE 102. The generated packets are encrypted to ACGW 105, and the encrypted packet is transmitted to ACGW 105. When the transmitting side UE 101 transmits the encrypted packet, the base station 103 receives the encrypted packet from UE 101 and transfers it to ACGW 105. ACGW 105 receives the encrypted packet from UE 101 and decrypts the packet. Further, ACGW 105 encrypts the packet addressed to the destination of the packet, i.e. UE 102, and transmits the encrypted packet. The base station 104 receives the encrypted packet from ACGW 105 and transfers it to the receiving side UE 102. The receiving side UE 102 receives the encrypted packet from ACGW 105 and decrypts it, and the packet from the transmitting side UE 101 is processed by the receiving processing. Such is the flow of the packet between UE-UE.

As the prior art of data division, the scalable audio coding as described in the Non-Patent Document 3 and the Patent Document 1 is known, in which sound (audio) signals are divided in bands, and each band is encoded individually.

Non-Patent Document 1: 3GPP (registered trademark) Technical Report 23.882; draft V1.1.0 (2006 April).
Non-Patent Document 2: 3GPP (registered trademark) Technical Report 25.813; V0.9.2 (2006 May).
Non-Patent Document 3: "Wideband Speech Coding Robust against Packet Loss"; Takeshi Mori, et al.; Collection of the Articles presented at the Institute of Electronics, Information and Communication Engineers (IEICE); 2005 July, Vol. J88-DII No. 7, pp. 1103-1113.
Patent document 1: Japanese Patent Application Publication No. 2003-241799 (Abstract)

However, in the flow of packets between UE-UE as described above, if UE 101 (UE1) and UE 102 (UE2) are connected to the same base station 103 as shown in FIG. 1, a packet transmitted by UE 101 flows in the order of UE 101→base station 103→ACGW 105→base station 103→UE 102 [the route (2)]. That is, in the route (2), the data is transferred via a route to and from ACGW 105 and the base station 103. As described above, according to the method of the prior art, when UE 101 and UE 102, which are performing packet communication, are connected to the same base station 103, the network resources between the base station 103 and ACGW 105 are consumed uselessly and cannot be used efficiently. ACGW 105 performs communication with a multiple of UEs, and the processing to decrypt the packets from UE and the processing to encrypt the packet to be transferred must be carried out, and a problem arises that much burden is placed on ACGW 105.

Incidentally, when UE 101 and UE 102 are connected to the same base station 103 as shown in FIG. 1, a route can be conceived, by which the packet is transmitted to and from the base station 103 and does not pass through ACGW 150 [route (1)]. However, for the purpose of protecting the user data from the attacks such as lawful interception, encryption must be adopted on the devices at the positions closer to the new network from E-Node B, i.e. between UE and ACGW. Also, for the purpose of communication control, e.g. for the purpose of charging the fees on user data on the network side, operators may require to count the number of packets on the devices closer to the network side or may require to perform lawful interception when necessary. It is difficult to meet such demands by the method as described above.

DISCLOSURE OF THE INVENTION

To solve the problems in the prior art as described above, it is an object of the present invention to provide a communication system, a communication method, a radio terminal, a radio relay device and a control device, by which it is possible to efficiently use network resources when a transmitting side radio terminal and a receiving side radio terminal are connected to the same radio relay device, to reduce the burden on the control device and to control the communication of the radio terminals by the control device.

To attain the above object, the present invention provides a communication system, said communication system comprises a radio relay device for performing radio communication with radio terminals with each other and a control device for performing packet transfer to and from said radio relay device and for controlling radio communication between said radio terminal and said radio relay device, wherein:

when a transmitting side radio terminal and a receiving side radio terminal are connected to the same radio relay device, said transmitting side radio terminal divides a transmitting packet addressed to said receiving side radio terminal into a first packet to be transmitted via a route not passing through said control device and a second packet to be transmitted via said control device, and transmits said first packet and said second packet to said radio relay device;

said radio relay device receives said first packet and said second packet transmitted from the transmitting side radio terminal and transmits said first packet to said receiving side radio terminal and transmits said second packet to said control device;

said control device receives said second packet transmitted from said radio relay device and transmits it to said radio relay device;

said radio relay device receives said second packet transmitted from said control device and transmits it to said receiving side radio terminal; and said receiving side radio terminal receives said first packet and said second packet transmitted from said radio relay device and restores the initial packet.

By the arrangement as described above, when a transmitting side radio terminal and a receiving side radio terminal are connected to the same radio relay device, a transmission packet addressed to the receiving side radio terminal is divided into a first packet to be transmitted via a route not passing through a control device and a second packet to be transmitted via the control device. As a result, it is possible to efficiently utilize the network resources, to reduce the burden on the control device, and to control the communication between the radio terminals by the control device.

The first packet to be transmitted via a route not passing through the control device contains an extended audio data when the band of audio signal is divided into a fundamental audio data in low frequency range and an extended audio data in high frequency range, and the second packet to be transmitted via the control device contains the fundamental audio data. Also, among an intra-screen coding data where image signal is encoded only within a screen and an inter-screen difference prediction coding data where inter-screen difference is encoded by prediction coding, the first packet to be transmitted via a route not passing through the control device contains the inter-screen difference prediction coding data, and the second packet to be transmitted via the control device contains the intra-screen coding data.

Also, the present invention provides the communication system as described above, wherein:

said transmitting side radio terminal encrypts the transmitting data to be transmitted to said receiving side radio terminal and generates said first packet excluding identification data to decrypt said encrypted data on said receiving side radio terminal, and generates said second packet containing said identification data; and said receiving side radio terminal puts said identification data in said second packet to a portion where said identification data is cut off in said first packet, and decrypts said encrypted data in said first packet.

Further, the present invention provides the communication system as described above, wherein:

said transmitting side radio terminal encrypts the transmitting data to be transmitted to said receiving side radio terminal, generates said first packet excluding identification data to decrypt said encrypted data on the receiving side radio terminal and a part of said encrypted data, and generates said second packet containing said identification data and said part of said encrypted data; and said receiving side radio terminal puts a part of said identification data and said part of said encrypted data in said second packet to a portion where a part of said identification data and said part of said encrypted data are cut off in said first packet and decrypts said encrypted data in said first packet.

Also, the present invention provides the communication system as described above, wherein:

said transmitting side radio terminal encrypts the transmitting data to be transmitted to said receiving side radio terminal, generates said first packet excluding a part of data necessary for decrypting said encrypted data on the receiving side radio terminal, and generates said second packet containing said part of the data necessary for said decrypting; and said receiving side radio terminal puts said part of data necessary for said decryption in said second packet to a portion in said first packet where said part of the data necessary for said decrypting is cut off, and decrypts said encrypted data in said first packet.

With the arrangement as described above, it is possible to maintain security of communication even when the first packet is transmitted via a route not passing through the control device. Also, because the initial data cannot be restored if both of the first packet and the second packet do not reach the receiving side radio terminal, the system side or the network side can control the direct communication between user equipments.

Further, to attain the above object, the present invention provides a communication method for performing radio communication between a radio terminal and a radio relay device, for transferring packets to and from said radio relay device by a control device, and for controlling radio communication between said radio terminal and said radio relay device by said control device, wherein said method comprises:

a step where, when the transmitting side radio terminal and the receiving side radio terminal are connected to the same radio relay device, said transmitting side radio terminal divides a transmitting packet addressed to the receiving side radio terminal into a first packet to be transmitted via a route not passing through said control device and said second packet to be transmitted via said control device, and transmits said first packet and said second packet to said radio relay device;

a step where said radio relay device receives said first packet and said second packet transmitted from said transmitting side radio terminal, transmits said first packet to the receiving side radio terminal, and transmits said second packet to said control device;

a step where said control device receives said second packet transmitted from said radio relay device and transmits it to said radio relay device;

a step where said radio relay device receives said second packet transmitted from said control device and transmits it to said receiving side radio terminal; and a step where said receiving side radio terminal receives said first packet and said second packet transmitted from said radio relay device, and restores the initial packet.

Also, to attain the above object of the invention, the present invention provides a transmitting side radio terminal in a communication system, said communication system comprises a radio relay device for performing radio communication with radio terminals with each other and a control device for performing packet transfer to and from said radio relay device and for controlling radio communication between said radio terminal and said radio relay device, wherein:

when said transmitting side radio terminal and the receiving side radio terminal are connected to the same radio relay device, said transmitting side radio terminal has means for dividing said transmitting packet to be transmitted to said receiving side radio terminal into a first packet to be sent via a route not passing through said control device and a second packet to be transmitted via said control device, and for transmitting said first packet and said second packet to said radio relay device;

said radio relay device receives said first packet and said second packet transmitted from said transmitting side radio terminal, transmits said first packet to said receiving side radio terminal and transmits said second packet to said control device;

said control device receives said second packet transmitted from said radio relay device and transmits said second packet to said radio relay device;

said radio relay device receives said second packet transmitted from said control device and transmits the packet to said receiving side radio terminal; and said receiving side radio terminal receives said first packet and said second packet transmitted from said radio relay device and restores the initial packet.

Further, to attain the above object of the invention, the present invention provides a radio relay device in a communication system, said communication system comprises said radio relay device for performing radio communication with radio terminals with each other and a control device for performing packet transfer to and from said radio relay device and for controlling radio communication between said radio terminal and said radio relay device, wherein:

when a transmitting side radio terminal and a receiving side radio terminal are connected to said radio relay device, and in case said transmitting side radio terminal divides the transmitting packet addressed to said receiving side radio terminal into a first packet to be transmitted via a route not passing through said control device and a second packet to be transmitted via said control device and transmits said first packet and said second packet to the radio relay device, said radio relay device has means for receiving said first packet and said second packet transmitted from said transmitting side radio terminal, for transmitting said first packet to said receiving side radio terminal and for transmitting said second packet to said radio relay device itself;

when said control device receives said second packet transmitted from said radio relay device itself and transmits said second packet to the radio relay device, said radio relay device has means for receiving said second packet transmitted from said control device, and for transmitting said second packet to said receiving side radio terminal; and said receiving side radio terminal receives said first packet and said second packet transmitted from the radio relay device and restores the initial packet.

Also, to attain the above object of the invention, the present invention provides a control device in a communication system, said communication system comprises a radio relay device for performing radio communication with radio terminals with each other and said control device for performing packet transfer to and from said radio relay device and for controlling radio communication between said radio terminal and said radio relay device, wherein:

when a transmitting side radio terminal and a receiving side radio terminal are connected to the same radio relay device, said control device has means for dividing a transmitting packet addressed to said receiving side radio terminal into a first packet to be transmitted via a route not passing through said control device and a second packet to be transmitted via said control device and for transmitting said first packet and said second packet to said radio relay device, and in case said radio relay device receives said first packet and said second packet transmitted from said transmitting side radio terminal and transmits said first packet to said receiving side radio terminal and said second packet to said control device, for receiving said second packet transmitted from said radio relay device and for transmitting said second packet to said radio relay device;

said control device has means for controlling radio communication between said radio terminal and said radio relay device based on said second packet;

said radio relay device receives said second packet transmitted from said control device and transmits said second packet to said receiving side radio terminal; and said receiving side radio terminal receives said first packet and said second packet transmitted from said radio relay device and restores the initial packet.

Further, to attain the above object of the invention, the present invention provides a receiving side radio terminal comprising a radio relay device for performing radio communication with radio terminals with each other and a control device for performing packet transfer to and from said radio relay device and for controlling radio communication between said radio terminal and said radio relay device, wherein:

when a transmitting side radio terminal and said receiving side radio terminal are connected to the same radio relay device, said transmitting side radio terminal divides a transmitting packet addressed to said transmitting side radio terminal into a first packet to be transmitted via a route not passing through said control device and a second packet to be transmitted via said control device, and transmits said first packet and said second packet to said radio relay device, said radio relay device receives said first packet and said second packet transmitted from said transmitting side radio terminal, transmits said first packet to said receiving side radio terminal and transmits said second packet to said control device, said control device receives said second packet transmitted from said radio relay device and transmits said second packet to said radio relay device, and when said radio relay device receives said second packet transmitted from said control device and transmits the second packet to said receiving side radio terminal, said receiving side radio terminal has means for receiving said first packet and said second packet transmitted from said radio relay device and for restoring the initial packet.

Also, to attain the above object of the invention, the present invention provides a communication system, wherein said communication system comprises a radio relay device for performing radio communication with radio terminals with each other and a control device for performing packet transfer to and from said radio relay device and for controlling radio communication between said radio terminal and said radio relay device, wherein:

when a transmitting side radio terminal and a receiving side radio terminal are connected to the same radio relay device, said transmitting side radio terminal encrypts data to be transmitted to the receiving side radio terminal and prepares a packet of said data, and transmits said packet to said radio relay device as a first packet addressed to said receiving side radio terminal to be transmitted via a route not passing through said control device, and turns a key data for decrypting the encrypted data to a packet, and transmits this packet to said radio relay device as a second packet addressed to the receiving side radio terminal to be transmitted via said control device;

said radio relay device receives said first packet and said second packet transmitted from said transmitting side radio terminal, transfers said first packet to the receiving side radio terminal, transfers said second packet to said control device, periodically copies a part of a plurality of said first packets, and transmits said copied packet to said control device as a third packet;

said control device receives said second packet transferred from said radio relay device, transfers said second packet to said radio relay device after confirming the key data contained therein, and acquires control information for said first packet based on said third packet transmitted from said radio relay device;

said radio relay device receives said second packet transferred from said control device and transfers said second packet to said receiving side radio terminal; and said receiving side radio terminal receives said first packet and said second packet transferred from said radio relay device, and decrypts said encrypted data based on said key data.

With the arrangement as described above, when a transmitting side radio terminal and a receiving side radio terminal are connected to the same radio relay device, a transmission packet addressed to the receiving side radio terminal is transferred to the receiving side radio terminal as a first packet transmitted via a route not passing through the control device, and a key data to decrypt the encrypted data in the first packet is transferred to the receiving side radio terminal as a second packet via a route passing through the control device. As a result, the network resources can be efficiently utilized, the burden on the control device can be reduced, and the control device can control the communication between the radio terminals. Also, even when the packet is not transmitted via the control device, the security of the communication of the first packet can be maintained. Further, the initial data cannot be restored unless both the first packet and the second packet reach the receiving radio terminal, and the system side, i.e. the network side, can control the direct communication between the user equipments.

Also, the radio relay device periodically copies a part of a plurality of the first packets and transmits the copied packet to the control device as a third packet. Thus, the control device can acquire control information on the first packet based on the third packet. Also, the transmitting side radio terminal sets a sequence number in each of the first packets, and the control device can control the number of the transfer packets of the first packets based on the sequence number inside the third packet.

Also, to attain the above object of the invention, the present invention provides a communication method for performing radio communication between a radio terminal and a radio relay device, for transferring packets to and from said radio relay device by a control device, and for controlling radio communication between said radio terminal and said radio relay device, wherein said method comprises:

a step where, when a transmitting side radio terminal and a receiving side radio terminal are connected to the same radio relay device, said transmitting side radio terminal encrypts data to be transmitted to said receiving side radio terminal and prepares a packet, transmits the packet as a first packet addressed to the receiving side radio terminal and to be transmitted via a route not passing through said control device to said radio relay device, prepares a packet of the key data to decrypt said encrypted data, and transmits said packet to said radio relay device as a second packet addressed to said receiving side radio terminal via said control device;

a step where said radio relay device receives said first packet and said second packet transmitted from said transmitting side radio terminal, transfers said first packet to said receiving side radio terminal, transfers said second packet to said control device, periodically copies a part of a plurality of said first packets, and transmits said packets as a third packet to said control device;

a step where said control device receives said second packet transferred from said radio relay device, confirms the key data inside the packet, transfers said second packet to said radio relay device, and acquires control information on said first packet based on said third packet transmitted from said radio relay device;

a step where said radio relay device receives said second packet transferred from said control device, and transfers the second packet to the receiving side radio terminal; and a step where said receiving side radio terminal receives said first packet and said second packet transferred form said radio relay device, and restores the encrypted data based on said key data.

Further, to attain the above object of the invention, the present invention provides a transmitting side radio terminal in a communication system, said communication system comprises a radio relay device for performing radio communication with radio terminals with each other and a control device for performing packet transfer to and from said radio relay device and for controlling radio communication between said radio terminal and said radio relay device, wherein:

when said transmitting side radio terminal and the receiving side radio terminal are connected to the same radio relay device, said transmitting side radio terminal encrypts the data to be transmitted to said receiving side radio terminal and prepares a packet of said data, transmits said packet as a first packet addressed to said receiving side radio terminal and to be transmitted via a route not passing through said control device to said radio relay device, prepares a packet containing a key data for decrypting said encrypted data, and said transmitting side radio terminal has means for transmitting said packet to said radio relay device as a second packet addressed to said receiving side radio terminal to be transmitted via said control device;

said radio relay device receives said first packet and said second packet transmitted from said transmitting side radio terminal, transfers said first packet to the receiving side radio terminal, transfers said second packet to said control device, periodically copies a part of a plurality of said first packets, and transmits said copied packet to said control device as a third packet;

said control device receives said second packet transferred from said radio relay device, confirms the key data inside the packet, transfers said second packet to said radio relay device, and acquires control information on said first packet based on said third packet transmitted from said radio relay device;

said radio relay device receives said second packet transferred from said control device and transfers said second packet to said receiving side radio terminal; and said receiving side radio terminal receives said first packet and said second packet transferred from said radio relay device, and decrypts said encrypted data based on said key data.

Also, to attain the above object of the invention, the present invention provides a radio relay device in a communication system, said communication system comprises said radio relay device for performing radio communication with radio terminals with each other and a control device for performing packet transfer to and from said radio relay device and for controlling radio communication between said radio terminal and said radio relay device, wherein:

when a transmitting side radio terminal and a receiving side radio are connected to the same radio relay device, said transmitting side radio terminal has means for encrypting a transmission data to said receiving side radio terminal and for preparing a packet containing said data, for transmitting said packet to said radio relay device as a first packet addressed to said receiving side radio terminal via a route not passing through said control device, for preparing a packet containing key data for decrypting said encrypted data, and when said packet is transmitted to said radio relay device as a second packet addressed to said receiving side radio terminal via said control device, said radio relay device receives said first packet and said second packet transmitted from said transmitting side radio terminal, transfers said first packet to said receiving side radio terminal, transfers said second packet to said control device, and periodically copies a part of a plurality of said first packets and transmits said packet as a third packet to said control device;

said control device receives said second packet transferred from said radio relay device, confirms the key data inside said packet, transfers said second packet to said radio relay device, and when control information on said first packet is acquired according to said third packet transmitted from said radio relay device, said radio relay device receives said second packet transferred from said control device, and transfers said second packet to said receiving side radio terminal; and said receiving side radio terminal receives said first packet and said second packet transferred from said radio relay device, and decrypts said encrypted data based on said key data.

Further, to attain the above object of the invention, the present invention provides a control device in a communication system, said communication system comprises a radio relay device for performing radio communication with radio terminals with each other and said control device for performing packet transfer to and from said radio relay device and for controlling radio communication between said radio terminal and said radio relay device, wherein:

when a transmitting side radio terminal and a receiving side radio terminal are connected to the same radio relay device, said transmitting side radio terminal encrypts a transmission data addressed to said receiving side radio terminal and prepares a packet containing said data, transmits said packet to said radio relay device as a first packet to said receiving side radio terminal via a route not passing through said control device, prepares a packet containing a key data for decrypting said encrypted data, transfers said packet as a second packet to said receiving side radio terminal via said control device, receives said first packet and said second packet transmitted from said transmitting side radio terminal, transfers said first packet to said receiving side radio terminal, transfers said second packet to said control device, and further, when a part of a plurality of said first packets is periodically copied and this copied packet is transmitted to said control device as a third packet, said control device receives said second packet transferred from said radio relay device, confirms the key data inside said packet and transfers said second packet to said radio relay device, and acquires control information on said first packet based on said third packet transmitted from said radio relay device;

said radio relay device receives said second packet transferred from said control device and transfers said second packet to said receiving side radio terminal; and said receiving side radio terminal receives said first packet and said second packet transferred from said radio relay device and decrypts said encrypted data based on said key data.

Also, to attain the above object of the invention, the present invention provides a receiving side radio terminal in a communication system, said communication system comprises a radio relay device for performing radio communication with radio terminals with each other and a control device for performing packet transfer to and from said radio relay device and for controlling radio communication between said radio terminal and said radio relay device, wherein:

when a transmitting side radio terminal and a receiving side radio terminal are connected to the same radio relay device, said transmitting side radio terminal encrypts a transmitting data addressed to said receiving side radio terminal and prepares a packet containing said data, transmits said packet as a first packet addressed to the receiving side radio terminal via a route not passing through said control device, prepares a packet containing a key data for decrypting said encrypted data, transmits said packet to said radio relay device as a second packet addressed to the receiving side radio terminal via a route passing through said control device, said radio relay device receives said first packet and said second packet transmitted from said transmitting side radio terminal, transfers said first packet to said receiving side radio terminal, transfers said second packet to said control device, periodically copies a part of a plurality of said first packets, and transfers said copied packet as a third packet to said control device, said control device receives said second packet transferred from said radio relay device, confirms the key data inside the packet, transfers said second packet to said radio relay device, acquires control information on said first packet based on said third packet transmitted from said radio relay device, and when said radio relay device receives said second packet transferred from said control device and transfers said packet to said receiving side radio terminal, said receiving side radio terminal receives said first packet and said second packet transferred from said radio relay device, and decrypts said encrypted data based on said key data.

The present invention provides such effects that there is no need to transmit all of the packets transmitted from the transmitting side radio terminal between the radio relay device and the control device, and partial data or small amount of data would be sufficient. Thus, network resources of the radio relay device and the control device can be efficiently utilized. Also, the control device does not have to perform decryption and encryption on all data in the packet, which is transmitted from the transmitting side radio terminal to the receiving side radio terminal, and only a part of data is decrypted and encrypted. As a result, the burden of the processing can be alleviated.

BRIEF DESCRIPTION OF THE DRAWINGS

FIG. 1 is a schematical drawing of a system configuration when a transmitting side UE and a receiving side UE are connected to the same E-Node B in the prior art and in an embodiment of the present invention;

FIG. 2 is a flow chart of processing when the UE-UE direct communication is started in the embodiment of the invention;

FIG. 3A is a drawing to explain a message sequence between UE and ACGW when the UE-UE direct communication is started in the embodiment of the invention and shows a case where UE1 and UE2 of FIG. 1 match "the UE-UE direct communication" respectively;

FIG. 3B is a drawing to explain a message sequence between UE and ACGW when the UE-UE direct communication is started in the embodiment of the invention and shows a case where UE in FIG. 1 does not match "the UE-UE direct communication" (UE2 does not match);

FIG. 7 is a flow chart to show packet transmitting processing of UE of FIG. 1;

FIG. 8 is a block diagram to show E-Node B of FIG. 1;

FIG. 32 is a drawing to explain a configuration of a packet in each of variation examples of the first and the second embodiments respectively.

BEST MODE FOR CARRYING OUT THE INVENTION

The First Embodiment

Figure 4:
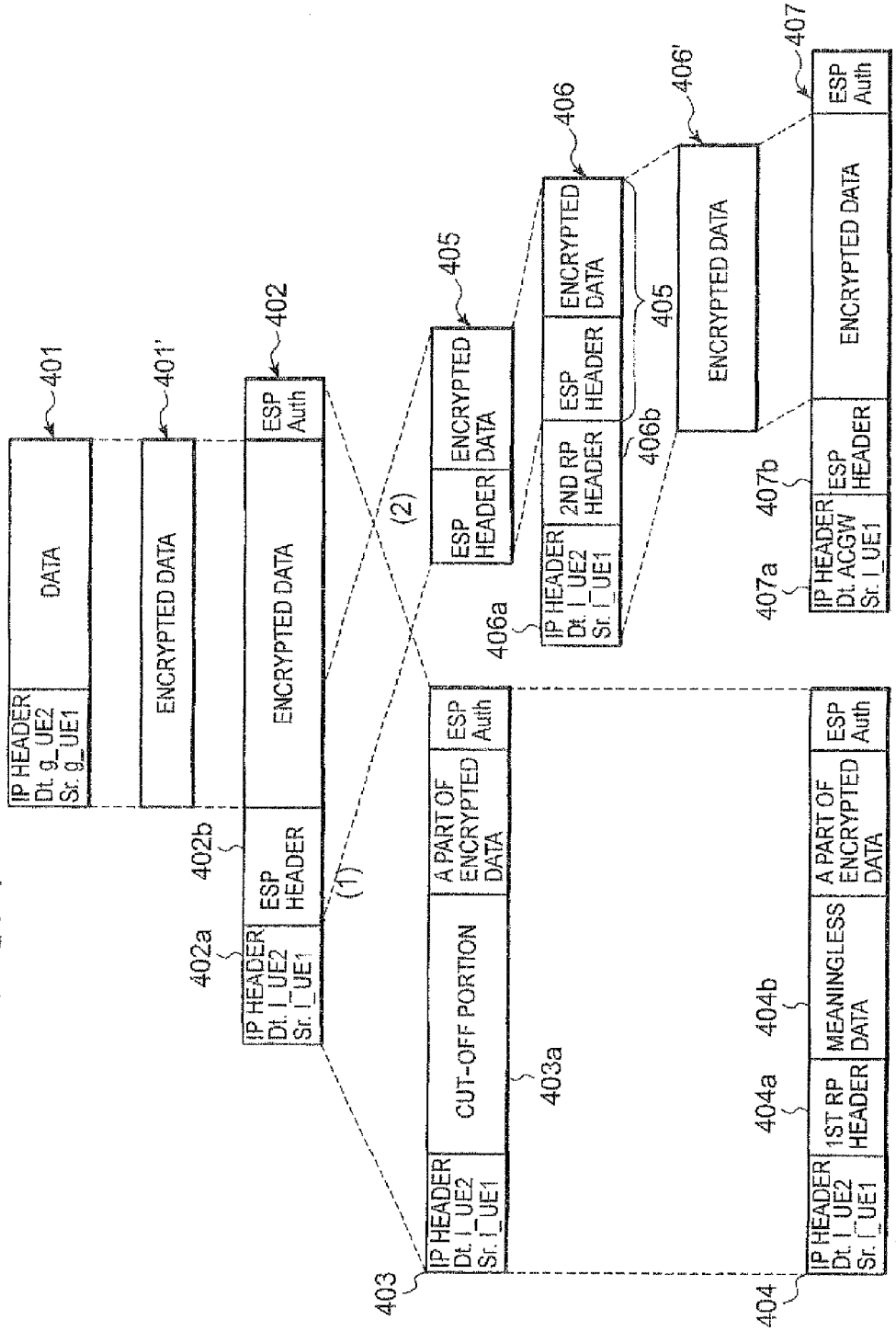
FIG. 4 is a drawing to explain packet dividing processing of the transmitting side UE of FIG. 1.

Description will be given below on the embodiment of the invention by referring to the attached drawings. FIG. 1 shows a condition where UE 101 and UE 102 are connected to the same base station (hereinafter, referred as "E-Node B"). This condition includes a case where the condition is continuously present from the moment of the starting of the communication and a case where UE 101 or UE 102 moves from the condition shown in FIG. 15.

Under the condition shown in FIG. 1 where UE 101 and UE 102 are connected to the same base station, operation is performed in accordance with the present invention as described below. When transmission is performed from UE 101 to UE 102, a packet to be transmitted is divided at UE 101 by the UE-UE direct communication" as described below in detail, and the packet is transferred by dividing it into a packet to be sent via a direct route (1) not passing through ACGW 105 and via an ACGW route (2) passing through ACGW 105. In the following, the packet to be sent via the direct route (1) is referred as a first packet, and a packet to be sent via the ACGW route (2) is referred as a second packet.

<Condition to Start Communication Between UE-UE>

In the first condition where the communication between UE 101 and UE 102 is started, the communication is started via ACGW 105 similarly to the conventional case. The transmitting side UE 101 generates a packet to be transmitted to the receiving side UE 102. The generated packet is encrypted to ACGW 105 and is transmitted to ACGW 105. The encrypted packet transmitted by UE 101 is received by E-Node B 103, and it is transferred to ACGW 105. ACGW 105 decrypts the encrypted packet as received, and routing destination is judged from the destination of the decrypted packet. ACGW 105 encrypts the packet to UE 102 and transmits it to UE 102. The encrypted packet as transmitted by ACGW 105 is received by E-Node B 103, and it is transferred to UE 102. The receiving side UE 102 receives the encrypted packet and decrypts it, and the packet from the transmitting side UE 101 is acquired. In the present embodiment, description will be given by assuming a case where a tunnel mode of IPsec ESP (Encapsulating Security Payload) is used as a method to encrypt and to decrypt the packet, while the present invention is not limited to the IPsec ESP system.

<Starting of the UE-UE Direct Communication>

The UE-UE direct communication is performed when ACGW 105 detects that the transmitting side UE 101 and the receiving side UE 102 are connected to the same E-Node B 103. In this case, ACGW 105 detects that the transmitting side UE 101 and the receiving side UE 102 are connected to the same E-Node B 103 through the routing process by detecting that E-Node B of the transfer destination when the packet is received and E-Node B, to which the packet is to be transferred, are the same, or ACGW 105 detects it from information on UE 101 or UE 102 under its control. When it is detected that the transmitting side UE 101 and the receiving side UE 102 are connected to the same E-Node B 103, ACGW sends an inquiry as to whether the UEs have capability of "the UE-UE direct communication" or not. In case both or one of the UEs does not have the capability, it is not possible to carry out "the UE-UE direct communication". When both UEs have the capability, it is indicated for each of UE 101 and UE 102 to set up a communication route for "the UE-UE direct communication". Also, ACGW 105 indicates E-Node B 103 to permit the transfer of the packet between UE 101 and UE 102.

<During UE-UE Direct Communication>

When the transmitting side UE 101 receives the instruction to perform "the UE-UE direct communication" from ACGW 105 and generates a packet addressed to the receiving side UE 102, the packet to UE 102 is first encrypted. Then, a part of the encrypted packet is cut off, and the data thus cut off is encrypted to ACGW 105. The transmitting side UE 101 transmits a first packet to UE 102 (via the direct route (1)) and transmits a second packet to ACGW 105 (via the ACGW route (2)). E-Node B 103 receives the first and the second packets from the transmitting side UE 101 and transfers the first packet addressed to UE 102 to UE 102, and transfers the second packet addressed to ACGW 105 to ACGW 105. ACGW 105 receives the second packet as transferred form E-Node B 103. Then, it decrypts the packet, encrypts the packet to UE 102, and transfers it to UE 102.

When the receiving side UE 102 has received only the first packet from UE 101, it holds the first packet as received and waits until the second packet arrives because the first packet alone gives no meaningful data. On the contrary, when only the second packet is received from ACGW 105, it waits for the arrival of the first packet. The receiving side UE 102 synthesizes the first packet with the second packet and restores the initial packet, which was generated by the transmitting side UE 101, and the packet is received.

<Termination of the UE-UE Direct Communication>

When UE 101 and UE 102 performing "the UE-UE direct communication" are not connected to the same E-Node B 103 any more because UE 101 and UE 102 are moving, ACGW 105 instructs UE 101 and UE 102 to terminate "the UE-UE direct communication" respectively. Also, it sends notification to E-Node B 103 and gives an instruction not to directly transfer the packet between UE 101 and UE 102.

Now, detailed description will be given on each processing.

<Starting of the UE-UE Direct Communication>

Referring to FIG. 2, FIG. 3A and FIG. 3B, description will be given below on the processing to start the UE-UE direct communication. At first, the transmitting side UE 101 and the receiving side UE 102 transmit and receive the packets respectively via ACGW 105. The transmitting side UE 101 generates a packet addressed to the receiving side UE 102. Then, the generated packet is encrypted and transmitted to ACGW 105. E-Node B 103 receives the encrypted packet thus transmitted and transfers it to ACGW 105. ACGW 105 decrypts the encrypted packet received and identifies the routing destination from the address of the decrypted packet. ACGW 105 encrypts the packet and transmits the packet to UE 102. E-Node B 103 receives the transmitted packet and transfers it to UE 102. The receiving side UE 102 receives and decrypts the encrypted packet and acquires the packet from the transmitting side UE 101. This is the condition before the starting of the UE-UE direct communication.

In FIG. 2, ACGW 105 detects that the transmitting side UE 101 and the receiving side UE 102 are both connected to the same E-Node B 103 (Step S21). For instance, ACGW 105 detects this at the time of routing processing from the fact that the E-Node B of the transfer source when the packet is received is the same as the E-Node B of the transfer destination. Or, ACGW 105 checks the connected E-Node B from information on UE under its control and detects that both UEs are connected to the same E-Node B. Then, ACGW 105 detects that the transmitting side UE 101 and the receiving side UE 102 are connected to the same E-Node B 103, and transmits an inquiry as to whether "the UE-UE direct communication" is possible or not to UE 101 and UE 102 respectively (Step S22).

FIG. 3A and FIG. 3B each shows a message sequence at the time of this inquiry respectively. In FIG. 3A, ACGW 105 transmits a request message (Req) to UE 1 (UE 101) and UE 2 (UE 102) (Step S31). After transmitting an inquiry, ACGW 105 waits for a response from UE 101 and UE 102 respectively (Step S23 in FIG. 2). When the response matches "the UE-UE direct communication function", UE 101 and UE 102 send back the possible candidate answer given below as a response to ACGW 105: the fact that the response matches the case (OK); a value of SPI (Security Parameter Index); (SPI (UE1) in case the response is from UE 101; SPI(UE2) in case the response is from UE 102); and encryption mode, which UE 101 and UE 102 can cope with (Step S24 in FIG. 2; Step S32 in FIG. 3A).

If a response indicates that it matches the case from both of UE 101 and UE 102, ACGW 105 notifies local address of the correspondent (i.e. UE 102 and UE 101) to UE 101 and UE 102 respectively (Step S25 in FIG. 2; Step S33 in FIG. 3A). This local address is an address for transport within the network. Also, the value of SPI (i.e. SPI(UE2) and SPI (UE1) as designated by the correspondents to UE 101 and UE 102 respectively are notified (Step S25 in FIG. 2; Step S33 in FIG. 3A). By transmitting a packet, which is encrypted and added with this value, the receiving side can judge under which condition the decrypting should be performed. ACGW 105 selects one from the candidates of the encryption mode as presented by UE 101 and UE 102 respectively, and the encryption mode is notified to UE 101 and UE 102 respectively (Step S33 in FIG. 3A). In case there is no encryption mode, which can be shared in common, it is not possible to start "the UE-UE direct communication". A common key for encrypting and decrypting is notified to UE 101 and UE 102 respectively. The communication path between ACGW 105 and UE 101 or UE 102 is over encrypted paths between UE 101 and ACGW 105 and between UE 102 and ACGW 105.

In the above, description has been given on a case where both UE 101 and UE 102 match "the UE-UE direct communication function". If one of them does not match the function, it is not possible to start "the UE-UE direct communication". If only one of UE 101 and UE 102 replies with a response that it matches (OK) to the inquiry, a response is sent to the responding UE that "the UE-UE direct communication" should not be performed (NG) (Step S27 of FIG. 2; Step S34 of FIG. 3B). By the message sequence as given above, information necessary for "the UE-UE direct communication" is delivered to UE 101 and UE 102 respectively. Security Association (SA) is established between UE 101 and UE 102, and the SA is used for the communication between them (Step S26 in FIG. 2). Also, ACGW 105 notifies to E-Node B 103 that "the UE-UE direct communication" is started between UE 101 and UE 102. E-Node B 103 changes internal setting such as setting of routing so that it is possible for UE 101 and UE 102 to communicate directly.

<During the UE-UE Direct Communication>

Now, description will be given on behaviors of UE 101, UE 102, E-Node B 103 and ACGW 105 during the UE-UE direct communication. In "the UE-UE direct communication", the transmitting side UE 101 generates a packet addressed to UE 102 and prepares, from a part of the packet, a packet to be sent via ACGW 105. Thus, the packet is transmitted as a first packet not passing though ACGW 105 and a second packet, which passes through ACGW 105. Only when both of the first packet and the second packet reach the receiving side UE 102, UE 102 can perform the receiving processing on the packet.

<Packet Transmission Processing by the Transmitting Side UE 101>

Referring to FIG. 4 to FIG. 7, description will be given below on packet transmitting processing of the transmitting side UE 101. First, description will be given on the structure of the transmitting packet of the transmitting side UE 101 by referring to FIG. 4, and further, referring to FIG. 5A and FIG. 5B. The transmitting side UE 101 generates data to be transmitted to the receiving side UE 102 and prepares a packet 401 to be sent to UE 102. Destination address (Dt) of the packet 401 is a global address (g_UE2) of UE 102. Source address (Sr) is a global address of UE 101 (g_UE1). In this case, the term "global address" and the term "local address" are properly differentiated from each other for convenience. That is, these are the address to be used for the communication between UE 101 and UE 102 and the address to be used for transporting the packet among ACGW 105, E-Node B 103, UE 101 and UE 102. Depending on the operation of address management in the network, both UE1 and UE2 may use "global address" or "local address".

The transmitting side UE 101 encrypts the packet 401 to be sent to UE 102 (encrypted data 401'). Then, the encrypted data 401' is encapsulated, and a packet 402 is prepared. Here, description will be given on a case where "the UE-UE direct communication" is performed. In case of the transmission towards ACGW 105, the data is encapsulated using IPsec ESP in tunnel mode and is transmitted to ACGW 105.

In the packet 402, which has been prepared by encapsulating the encrypted data 401', a "local address" of UE 102 (l_UE2) is set up to the destination address of an IP header 402a, which is a tunnel header, and a "local address" (l_UE1) of UE 101 is set up as the source address. Here, "local address" of UE 102 is an address, which is notified when an instruction of "the UE-UE direct communication" is given from ACGW 105. The transmitting side UE 101 divides the packet 402, which has been encrypted and encapsulated and is to be sent to UE 102, and a first packet 404 to be sent via a direct route (1) and a second packet 406 to be sent via the ACGW route (2) are prepared.

In this case, the packet 403 on the direct route (1) side is a packet, which has been prepared by cutting a part of the data from the initial packet 402. It is supposed here that it is a packet, which is prepared by cutting off a part of an ESP header 402b and a part of the encrypted data 401' subsequent to it. SPI is included in the ESP header, and the receiving side can identify by which key the data can be decrypted, depending on the value of SPI. That is, it has a role of identifying data for the purpose of performing the decryption. Here, an example has been given on a case where a part of the encrypted data is cut off, while the size of the data can be adjusted in any arbitrary manner, and the size may be set to 0. In such case, it may be referred as a method not including the encrypted data Further, it may be a part of the ESP header or a part of the identification data. Specifically, the significance of the data to be cut off lies in that no meaning can be found by the data, which the receiving side has received via the direct route (1). However, in the present embodiment, a first RP header is overwritten on a portion, which has been cut off as described below, and the data of the cut-off portion must be bigger than the first RP header.

In the present embodiment, description has been given on an example where it is overwritten with other data at the site where the data of the first packet has been cut off, while a method may be adopted to cut off the cut-off data (hereinafter referred as data portion) and to insert the RP header to the cut-off site. In such case, the data of the second packet is inserted into the site where the RP header is removed on the receiving side. In this case, the data to be cut off can be determined regardless of the size of the first RP header.

In the packet processing on the transmitting side as shown in FIG. 4, the remaining portion 403a is overwritten with "0x00" or meaningless data after the partial data has been cut off from the initial packet 402 so that the receiving side UE 102 cannot analogize or estimate the data, which has been there before a partial data was cut off. A first replacement (hereinafter referred as "RP") 404b is placed at the foremost position of the cut-off portion 403a of the packet 403, and a packet 404 is prepared. This first RP header 404b indicates a position, to which the cutoff data portion 405 is sent back to the original position when the first packet 404 is synthesized with the second packet 406. In a "Next Header" region within the IP header 404a of the first packet 404, a value to designate the ESP header is entered. This value is replaced by the value indicated by the first RP header 404b.

The second packet 406 is a packet, which has the ESP header 402b as cut off from the initial packet 402 and a part of the encrypted data 401' subsequent to it as a data portion 405. At the foremost position of the data portion 405, an IP header 406a and a second RP header 406b are added. The IP header 406a sets up "local address" of UE 102 as the destination address similarly to the header of the first packet 404 and sets up "local address" of UE 101 as the source address. Because it is the same IP header as that of the first packet 404, the receiving side UE 102 can differentiate it from the other packet when the first packet 404 is synthesized with the second packet 406. Also, the value of the "Next Header" in the IP header 404a of the first packet 404 is included in the second RP header 406b. That is, it is a value to indicate the ESP header 402b. When the receiving side UE 102 synthesizes the first packet 404 with the second packet 406, the value of the "Next Header" in the IP header 404a can be set back to the initial value. Also, RP-ID (RP header identifier) is included in the first RP header 404b and the second RP header 406b, and these two RP headers have the same value. As a result, the receiving side UE 102 is prevented from erroneously taking the other packet when the packets 404 and 406 are synthesized.

Because the second packet 406 is addressed to ACGW 105, it is encrypted to ACGW 105 (the encrypted data 406'), and this encrypted data 406' is encapsulated and turned to a packet 407. The destination address of the IP header 407a, which is a tunnel header of the packet 407, is ACGW 105, and the source address is "local address" of UE 101.

Next, referring to FIG. 5A and FIG. 5B respectively, description will be given on the format of the RP headers 404b and 406b respectively. Each of the first and the second RP headers 404b and 406b has a format similar to that of an extended header such as an end point option header of IPv6 (RFC 2460). In the first one octet (501 and 504) of the RP headers 404b and 406b, a value of the "Next Header" is set up, which indicates the next extended header. A value (RP header length) to indicate length of the extended header is set up on the second octets (502 and 505). RP-ID, i.e. a value to indicate an identifier to uniquely identify RP headers 404b and 406b, is set up on the subsequent two octets (503 and 506). Following to this, an option is added.

Figure 5A:
FIG. 5A is a table to explain a format of an RP header of FIG. 4 and showing a format of a first RP header of FIG. 4.
Figure 5B:
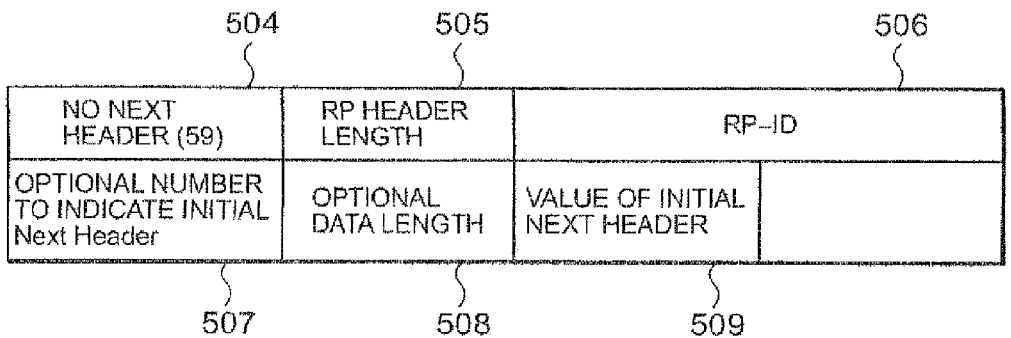
FIG. 5B is a table to explain a format of an RP header of FIG. 4 and showing a format of a second RP header of FIG. 4.

In the case of the format of the first RP header 404b, no header comes next to the first RP header 404b on the first one octet (501) as shown in FIG. 5A, and a value of "No Next Header (59)" is set up. RP header length is set up at the next octet (502) and RP-ID is set up at the octet (503) next to it. In the case of the format of the second RP header 406b, as shown in FIG. 5B, the value of "No Next Header (59)", and subsequently, RP header length, and further, RP-ID are set up in each of the first three octets (504, 505 and 506) respectively. As optional data, a value of "Next Header" of the initial packet is set up. In the optional data to set up "Next Header" of the initial packet, an optional number to indicate the optional data of the value of the initial "Next Header" is set up in the first one octet (507). Subsequently, optional data length (508) and the initial "Next Header" value (509) are set up.

As the optional data of the second RP header 406b, packet size of the initial packet 402 can be conceived. By this optional data, ACGW 105 can recognize packet size of the initial packet 402, and this makes it easier to grasp the condition of use in the network based on packet communication of UE 101 and UE 102. In the above, a region of RP-ID is provided at the RP headers 404b and 406b, while RP-ID may also be treated as the optional data. In such case, the RP headers 404b and 406b can be regarded as equal to the end point option header. So far, description has been given on the format of the RP headers 404b and 406b.

Next, referring to FIG. 6, description will be given below on a packet transmitting unit of UE 101 (and UE 102). Before the starting of "the UE-UE direct communication", the transmitting side UE 101 generates the data to be transmitted to UE 102 at a data generating unit 601. Next, the packet 401 addressed to UE 102 is generated at a packet generating unit 602 by using this data. The generated packet 401 can be delivered and transmitted to a packet-transmitting unit 607. On the other hand, when it is to be transmitted to ACGW 105, the packet is encrypted at an IPsec encrypting-encapsulating unit 603, and the encrypted packet is delivered to the packet transmitting unit 607 and it is transmitted.

When the transmitting side UE 101 receives an inquiry of "the UE-UE direct communication" from ACGW 105, and "the UE-UE direct communication" is performed as a result, the transmitting UE 101 delivers the packet 401, which was generated and addressed to UE 102, to the IPsec encrypting-encapsulating unit 603. In this case, it is not to encrypt the packet to ACGW 105, but it is encrypted by using an encryption key to UE 102 as acquired when the instruction of "the UE-UE direct communication" was received. In the encapsulation of IPsec ESP, the destination address is "local address" of UE 102. In the UE-UE direct communication, the transmitting side UE 101 delivers the packet 402 encrypted to UE 102 to a division processing unit 604, and the first packet 404 and the second packet 406 are generated. More concretely, when the first packet 404 is generated, the ESP header 402b in the initial packet 402 and a part of the encrypted data 401' subsequent to it are cut off, and the packet 403 is generated. The region where the data portion 405 is cut off is overwritten with 0x00 or with meaningless data.

The transmitting side UE 101 prepares a first RP header 404b and a second RP header 406b at an RP header setting unit 605. The first RP header 404b is added to the packet 403, and a first packet 404 to be transferred to UE 102 is prepared. Then, the second RP header 406b is added to a second packet 406. The first RP header 404b is overwritten at the initial position of the ESP header 402b of the first packet 404. As a result, when the first packet and the second packet are synthesized at the receiving side UE 102, a position, to which the data portion 405 is to be returned, can be identified.

At a Next Header rewriting unit 606, a value to indicate the first RP header 404b is set up at the "Next Header" in the IP header 404a of the first packet 404. In so doing, the node, which received the first packet 404, can recognize that the first RP header 404b is placed subsequent to the IP header 404a. The initial "Next Header" value as set up in the IP header 404a of the first packet 404 is set up in the second RP header 406b. As a result, the "Next Header" value can be returned to the initial position when the first packet 404 and the second packet 406 are synthesized. Also, the same RP-ID (RP header identifier) is set up at the first RP header 404b and the second RP header 406b. This makes it possible to prevent from erroneously taking the first packet 404 and the second packet 406 with the other packet at the time of synthesizing.

After finishing the processing as given above, the first packet 404 is delivered to the packet transmitting unit 607 and is transmitted. The second packet 406 has a data portion 405 and the second RP header 406b, and it is delivered to the packet-generating unit 602. At the packet-generating unit 602, the transmitting side UE 101 adds an IP header 406a before the data portion 405 as cut off from the initial packet 402 and the second RP header 406b and generates the second packet 406. The destination address of the second packet 406 is "local address" of UE 102. This is the same as the IP header 404a of the first packet 404. By the IP headers 404 and 406a and RP-ID, the receiving side UE 102 can synthesize without mixing up the first packet 404 with the second packet 406. At the IPsec encrypting-encapsulating unit 603, the transmitting side UE 101 can encrypt and encapsulate the second packet 406 to be addressed to ACGW 105, and a packet 407 for ACGW 105 is generated. The packet 407 thus generated is delivered and transmitted to the packet transmitting unit 607.

Next, referring to FIG. 7, description will be given on the processing of the transmitting side UE 101. First, the transmitting side UE 101 generates the packet 401 to be transmitted to UE2 (UE 102) as shown in FIG. 4 (Step S71). Because the transmitting side UE 101 has received an instruction of "the UE-UE direct communication" from ACGW 105 and has acquired the encryption mode, the encryption key and the security parameter index (SPI) to encrypt the packet as addressed to the receiving side UE 102, which were explained in connection with FIG. 2, FIG. 3A and FIG. 3B, the encryption data 401 to UE 102 is encrypted by using these types of information. In this case, the transmitting side UE 101 encrypts it for the receiving side UE 102, encapsulates it according to the IPsec ESP procedure and generates a packet 402 for UE 102 (Step S72).

Next, the transmitting side UE 101 cuts off a part (data portion 405) of the packet 402 for UE 102 thus generated and generates the first packet 403 with a part (data portion 405) cut off and a second packet 406 newly generated from the cut-off data portion 405 (Step S73). A region 403a as cut off from the first packet 403 is overwritten with 0x00 or with meaningless data. Namely, it is so processed that, even when only the first packet 404 is received, the receiving side UE 102 cannot receive it. The data portion 405 actually cut off is the ESP header 402b of the initial packet 402 and the encrypted data 401' subsequent to it. There is no special designation on the size of the data portion to be cut off. However, it must be bigger than the first RP header 404b. If the data portion 405 to be cut off is too big, the data to be sent via ACGW 105 becomes bigger, and this is not desirable. The first packet 403 is a packet addressed to UE 102, and the second packet 406 is a packet, which is to be sent to UE 102 via ACGW 105. In case a method to insert the first RP header to remove the data region and to insert in it is used instead of a method to overwrite the region of the cut-off data with meaningless data, the size of the data to be cut off may not be in the size bigger than the size of the first RP header.

The transmitting side UE 101 adds the first RP header 404b at the foremost portion where the data of the first packet 403 has been cut off (Step S74). This is information to indicate the position, to which the data portion of the second packet 406, i.e. the data portion 405 cut off, is to be returned to the initial position. Also, the transmitting side UE 101 changes the value of the "Next Header" at the IP header 404a of the first packet 404. Because the ESP header 402b was subsequent to the IP header 402a in the packet 402 before it was cut off, a value to indicate the ESP header 402b is set up at the "Next Header" at the IP header 402a. This value in the IP header 404a is replaced with a value indicating the first RP header 404b. In so doing, the receiving side node can identify a header, which is subsequent to the IP header 404a and can perform processing on the first RP header 404b, and not on the ESP header 402b. The transmitting side UE 101 transmits the replaced first packet 404 to UE 102 (Step S75). Specifically, the first packet 404 is directly transferred from E-Node B 103 to UE 102, and not via ACGW 105.

On the other hand, the transmitting side UE 101 generates the second packet 406 from the cut-off data portion 405. The second RP header 406b is added to the second packet 406 (Step S76). The first RP header 404b and the second RP header 406b contain RP-ID with the same value. By this RP-ID, the receiving side node can decide which of the first packet 404 and which of the second packet 406 should be synthesized. Also, the second RP header 406b contains a value of the "Next Header" of the initial packet 402. That is, when the first packet 404 is synthesized with the second packet 406, a value to turn the value of the "Next Header" (which was at the initial IP header 402a) to the initial value is contained in the second RP header 406b. The destination of the second packet 406 is UE 102. This is the same as the case of the IP header 404a of the first packet 404. Because the IP headers 404a and 406a are the same and the RP-ID has the same value, the receiving side node can identify the first packet 404 and the second packet 406 to be synthesized and synthesizes them.

The second packet 406 has an IP header 406a, which is the same as the IP header 404a of the first packet 404, and there is a second RP header 406b subsequent to it, and the data portion 405 as cut off from the initial packet 402 comes after it. The second packet 406 is a packet, which reaches UE 102 via ACGW 105. The transmitting side UE 101 performs the IPsec ESP tunnel mode processing addressed to ACGW to the second packet 406 and generates a second packet 407 (Step S77). Then, the transmitting side UE 101 transmits the second packet 407 to ACGW 105 (Step S78). That is, the second packet 407 is a packet, which is transferred to UE 102 via ACGW 105.

<Processing at E-Node B>

Next, referring to FIG. 8, description will be given below on a configuration of the E-Node B 103. E-Node B 103 receives the packet at a packet receiving unit 801. In case the received packet is a packet addressed to own node, E-Node B 103 delivers it to a receiving packet processing unit 802. In case it is a packet, which must be transferred, it is delivered to a packet transfer processing unit 803. At the packet transfer processing unit 803, E-Node B 103 confirms the packet to be transferred. There is no restriction in case of a packet, which is to be transferred from ACGW 105 to UE 101 or UE 102. Also, there is no restriction in case of a packet, which is to be transferred from UE 101 or UE 102 to ACGW 105. When it is to be transferred from UE to UE, E-Node B 103 confirms whether the packet to be transferred meets the requirements. When the packet is transferred from UE to UE, E-Node B 103 confirms whether it is the communication permitted by ACGW 105 at an UE-UE communication confirming unit 804. Also, it is confirmed at an RP header confirming unit 805 as to whether the packet contains the first RP header 404b or not. E-Node B 103 delivers and transmits the packet to be transferred to a packet transmitting unit 806.

Figure 9:
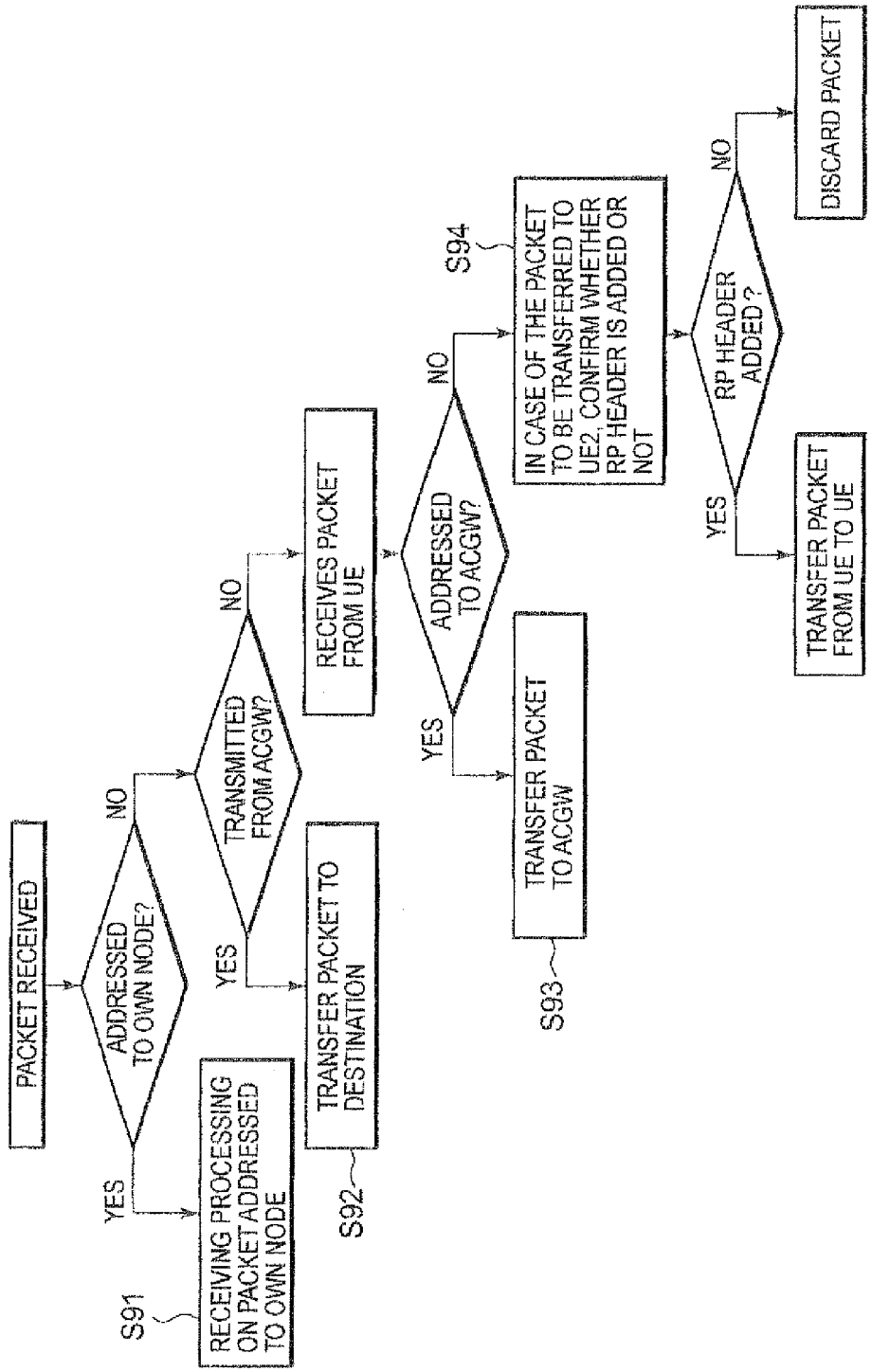
FIG. 9 is a flow chart to show packet receiving processing of E-Node B of FIG. 1.

Next, referring to FIG. 9, description will be given on packet relay processing of E-Node B 103. In case the packet is addressed to its own node, E-Node B 103 performs the receiving processing for a packet addressed to its own node (Step S91). This is a case where an instruction is given from ACGW 105, for instance. In case the packet is a packet other than the one addressed to its own node, E-Node B 103 performs the transfer processing. In this case, it is confirmed whether it is a packet sent from ACGW 105 or not. In case it is a packet sent from ACGW 105, it is transferred to the UE of the destination (Step S92). This is the case of a second packet 1009 (to be described later), which is transmitted from ACGW 105 to UE 102.

On the other hand, in case a packet transmitted—not from ACGW 105—but from UE 101 or UE 102, E-Node B 103 confirms whether it is addressed to ACGW 105 or not. In case it is a packet transmitted from UE 101 or UE 102 to ACGW 105, it is transferred to ACGW 105 (Step S93). For instance, this is the case of the second packet 407 to be transmitted from UE 101 to UE 102 via ACGW 105. Further, in case a packet transmitted from UE to UE is to be transferred, E-Node B 103 confirms whether direct communication is permitted between UE 101 and UE 102 or not (Step S94), and also confirms whether the first RP header 404b is added or not. Regarding to whether direct communication is permitted or not, a notification is given from ACGW 105 in advance. To decide whether the first RP header 404b is contained or not, the packet actually received should be checked. This is to confirm that the receiving processing may not be performed only on the packet transmitted from UE. For instance, it is the case of the first packet 404 transmitted from UE 101 to UE 102.

<Processing at ACGW>

Figure 10:
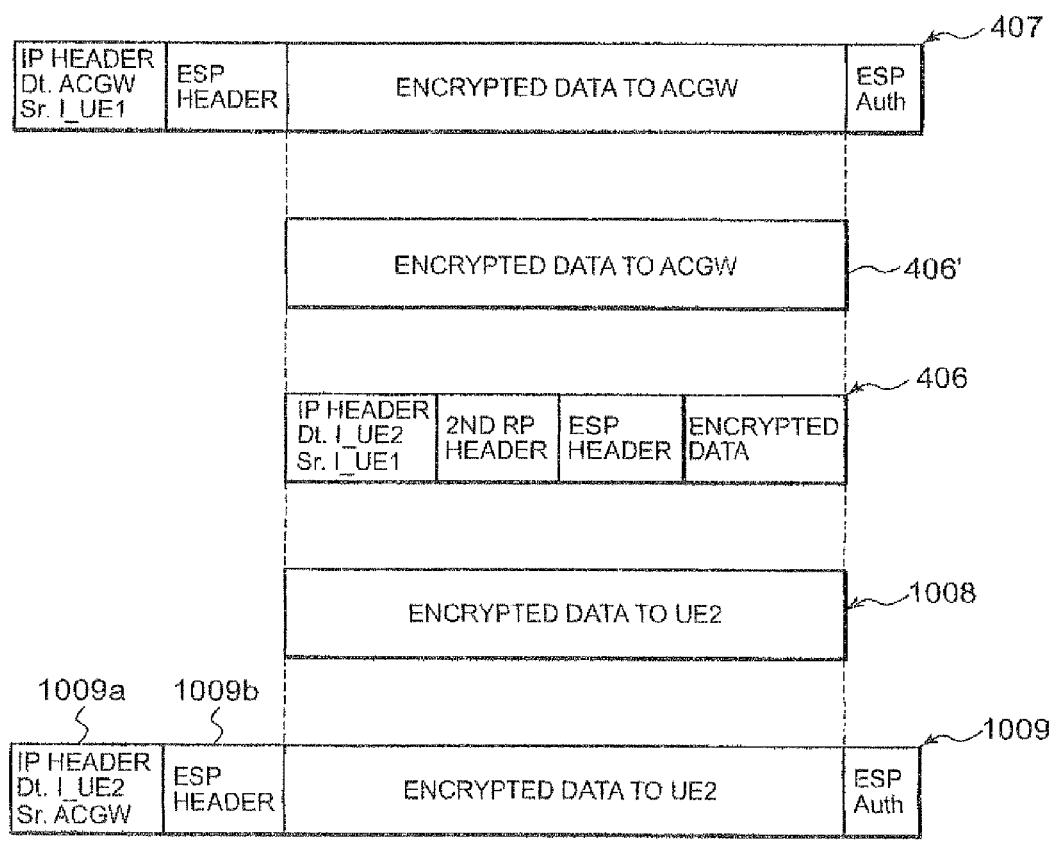
FIG. 10 is a drawing to show packet receiving and transmitting processing of ACGW of FIG. 1.

Next, referring to FIG. 10, description will be given on packet relay processing of ACGW 105. In case ACGW 105 receives a packet 407 of "the UE-UE direct communication", the destination address of the packet 407 is ACGW 105, i.e. it is addressed to its own node for ACGW 105. When decrypting and decapsulating are performed on this packet 407, the packet 406 generated by UE 101 for UE 102 comes out. Destination address of this packet 406 thus coming out is "local address" of UE 102, and the source address is "the local address" of UE 101. Also, this packet 406 contains the second RP header 406b. Incidentally, in case "the UE-UE direct communication" is not performed, the destination address of the packet thus coming out is "the global address" of UE 102, and the source address is "the global address" of UE 101.

As the result of decrypting, ACGW 105 judges the transfer destination based on the destination address of the packet 406, which has come out. In the present case, it is UE 102. ACGW 105 performs the IPsec ESP tunnel mode processing and encrypts the packet for UE 102, generates an encryption data 1008, performs encapsulating processing and generates a packet 1009. The destination address of an IP header 1009a of a packet 1009 is "the local address" of UE 102, and the source address is the address of ACGW 105.

Figure 11:
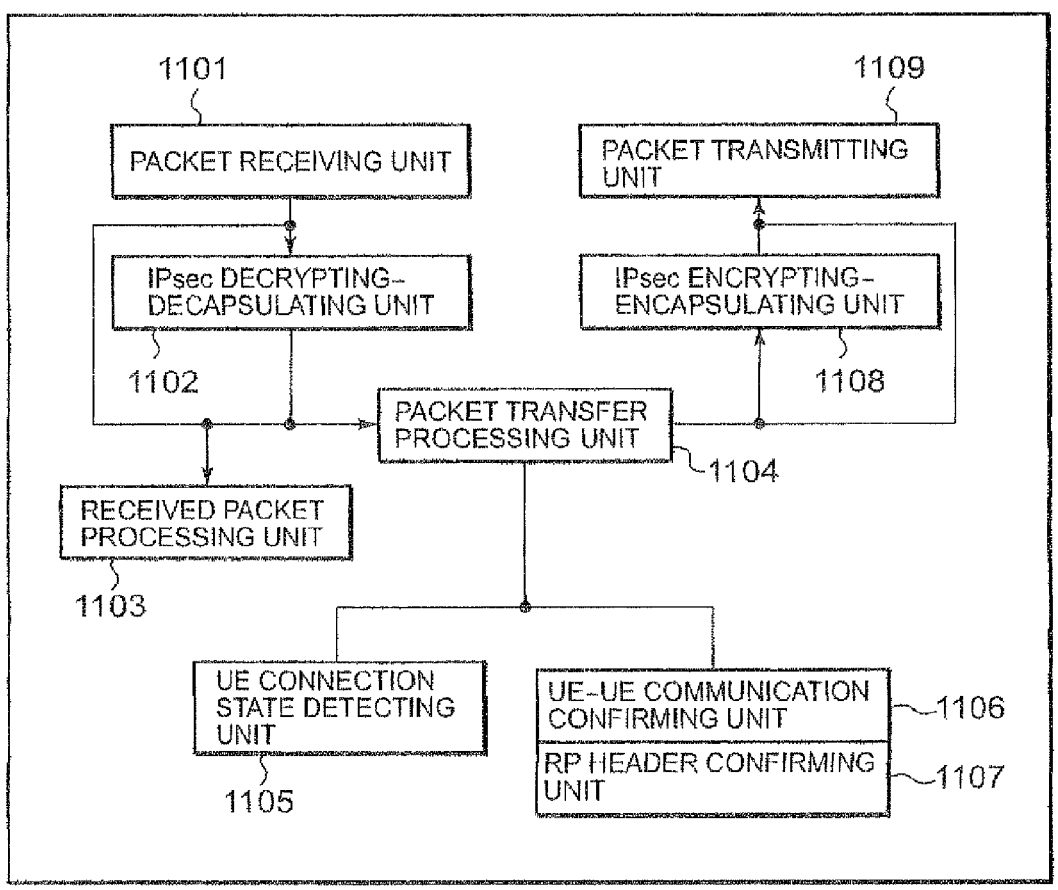
FIG. 11 is a block diagram to show ACGW of FIG. 1.

Next, referring to FIG. 11, description will be given on a configuration of ACGW 105. ACGW 105 receives a packet at a packet receiving unit 1101. If it is a packet encrypted and is addressed to its own node, decrypting and decapsulating are performed at an IPsec decrypting-decapsulating unit 1102. After the decrypting, ACGW 105 delivers the packet addressed to its own node, which has already been decrypted and for which no decrypting is required, to a receiving packet processing unit 1103. A packet to be transferred is delivered to a packet transfer processing unit 1104. ACGW 105 performs transfer processing on the packet at the packet transfer processing unit 1104. When the transfer destination is confirmed and "the UE-UE direct communication" is being performed, it is confirmed whether "the UE-UE direct communication" is permitted or not at an UE-UE communication confirming unit 1106. Also, it is confirmed at an RP header confirming unit 1107 as to whether the second RP header 406b is contained or not.

In ACGW 105, an UE connecting state detecting unit 1105 checks that the UEs under communication are not connected to the same E-Node B. In case the UEs are connected to the same E-Node B, an inquiry is sent to UEs as to whether both UEs have capability for "the UE-UE direct communication" or not. If both UEs have the capability, it is indicated for the UEs to perform "the UE-UE direct communication". ACGW 105 decides the destination of the packet at the packet transfer processing unit 1104 and delivers a packet, which requires IPsec encrypting processing, to an IPsec encrypting-encapsulating unit 1108. Then, the encrypted packet is delivered and transmitted to a packet transmitting unit 1109 and the packet is transmitted. In case it is a packet, which does not require IPsec encrypting processing, it is directly delivered and transmitted to the packet transmitting unit 1109.

Figure 12:
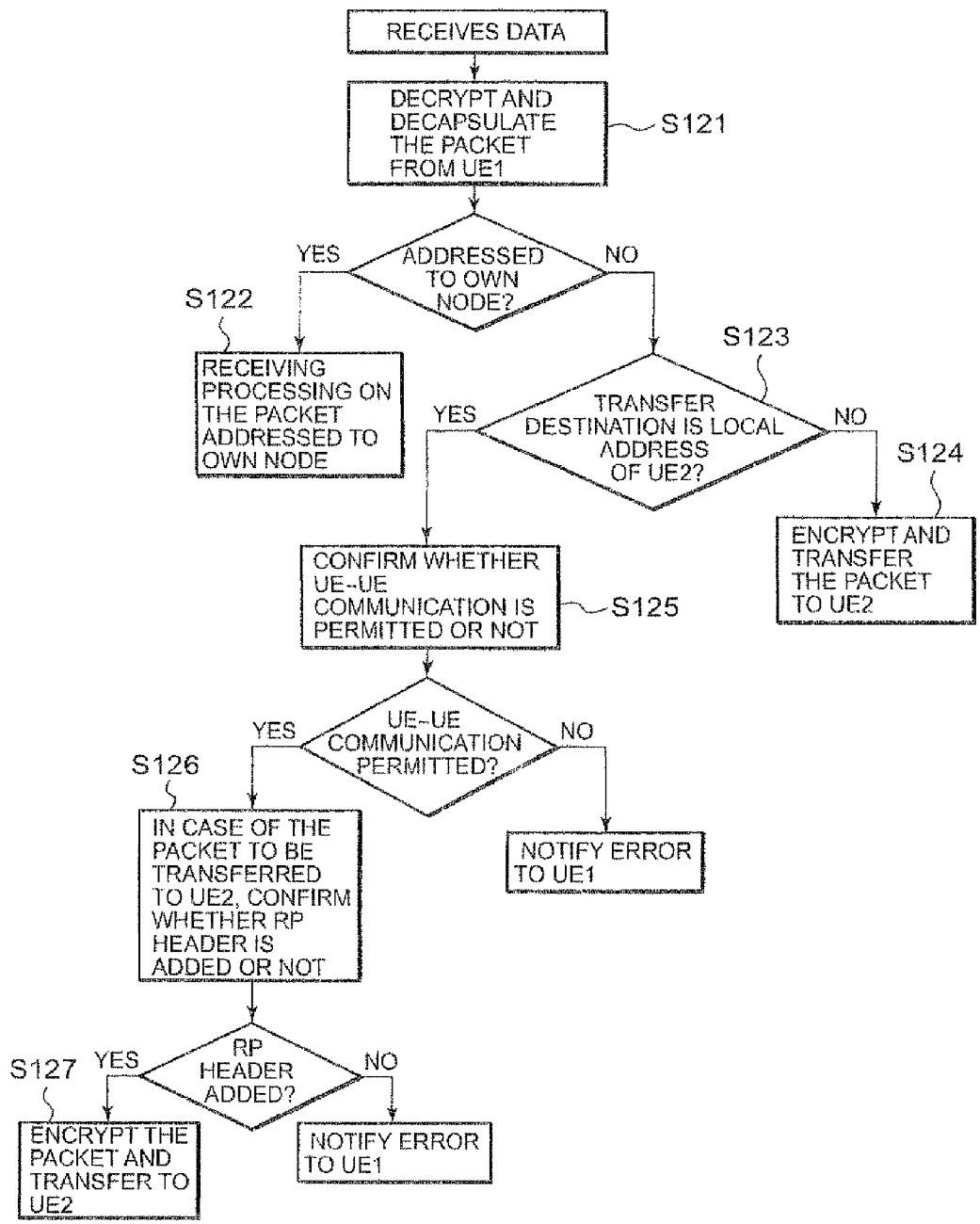
FIG. 12 is a flow chart to show packet receiving processing of ACGW of FIG. 1.

Next, referring to FIG. 12, description will be given on packet relay processing of ACGW 105. When ACGW 105 receives a packet and the packet has already been encrypted by IPsec encryption, it performs decrypting and decapsulating on the packet (Step S121). If the packet is decapsulated and the packet coming out is a packet addressed to its own node, the packet is processed as a packet addressed to its own node (Step S122). When a packet to be transferred to UE is received, ACGW 105 confirms whether the destination address is "the local address" or not (Step S123). If it is not "the local address" but it is "the global address", the packet is transferred to UE. When the packet is transferred to UE, the packet is encrypted for UE and it is transmitted (Step S124).

In case the destination address of the packet to be transferred to UE is "the local address", it is confirmed whether "the UE-UE direct communication" is permitted or not (Step S125). If the packet is the packet of "the global address", the packet is sent via ACGW 105. On the other hand, if it is "the local address", it is IP for transport, and the packet can be sent directly to UE 102. For this reason, ACGW 105 checks the destination address. In case the packet is a packet to be transferred to "the local address" of UE, ACGW 105 confirms whether the second RP header 406b is added or not (Step S126).

This is performed for the purpose of confirming that a part of the data portion 405 has been sent via ACGW 105 in "the UE-UE direct communication". When the data portion 405, which is a part of the initial packet 401, is sent via ACGW 105, ACGW 105 maintains its capability to control the packet communication between UE-UE. In addition, because it is not all data contained in the initial packet 402, the use of the network resources between ACGW 105 and E-Node B 103 can be suppressed, and the burden of the processing such as encrypting and decrypting at ACGW 105 can be alleviated. From the packet 406 addressed to "the local address" of UE including the second RP header 406b, ACGW 105 generates an encrypted packet 1009 addressed to UE by using the IPsec ESP tunnel mode and transmits it (Step S127).

<Processing at the Receiving Side UE>

Figure 13:
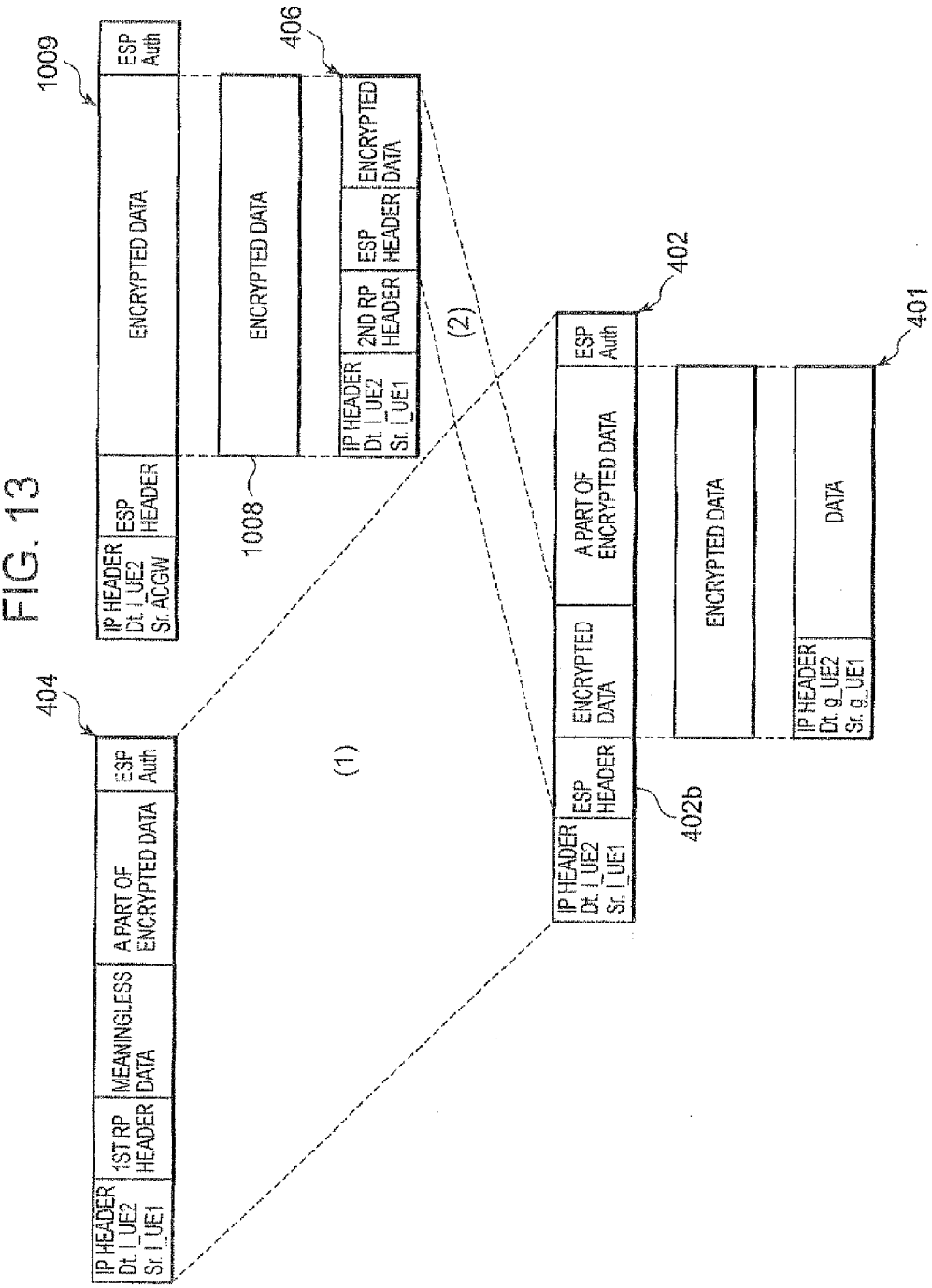
FIG. 13 is a drawing to explain packet synthesizing processing of the receiving side UE of FIG. 1.

Now, referring to FIG. 13, description will be given on packet receiving processing of the receiving side UE 102. The receiving side UE 102 receives the first packet 404 and the second packet 1009. The first packet 404 is a packet, which has been transmitted by the transmitting side UE 101 to UE 102 and has been transferred by E-Node B 103 to UE 102. On the other hand, the second packet 1009 is a packet, which has been transmitted by the transmitting side UE 101 to ACGW 105, transferred by E-Node B to ACGW 105, decrypted by ACGW 105 and transmitted after encrypting it for UE 102 in order to transfer to UE 102. E-Node B 103 transfers the packet 1009 addressed to UE 102 from ACGW 105, and UE 102 receives it. Because the first packet 404 contains the first RP header 404b, the receiving side UE 102 stores the packet 404 until a packet having the same RP-ID is received.

When the second packet 1009 is received, the receiving side UE 102 performs decrypting based on SA information from ACGW 105 because it is an encrypted packet from ACGW 105. The packet 406 coming out as the result of the decrypting is the second packet generated by UE 101 and addressed to UE 102. Its destination address is "the local address" of UE 102, and the source address is "the local address" of UE 101. Also, this packet 406 contains the second RP header 406b. The receiving side UE 102 synthesizes the first packet 404 and the second packet 406 having the same RP-ID. In the synthesizing procedure, the data portion 405 of the second packet 406 is overwritten at the foremost position of the first RP header 404b of the first packet 404. Further, a value of "the Next Header" contained in the second RP header 406b is set up in a region of "the New Header" of the IP header 404a of the first packet 404. By this synthesizing processing, the initial packet 402 generated by UE 101 and addressed to UE 102 is restored.

Because the receiving side UE 102 can identify that the synthesized packet 402 is a packet, which contains the ESP header 402b and is encrypted and addressed to UE 102, the receiving side UE 102 performs decrypting based on SA information from UE 101, and the initial packet 401 is restored. As the key and SPI for decrypting, the information acquired from ACGW 105 is used, which was acquired from ACGW 105 when ACGW 105 has given the instruction on "the UE-UE direct communication". The data to be acquired by the receiving side UE 102 as the result of decrypting is the packet 401 generated by UE 101 and addressed to UE 102. Its destination address is "the global address" of UE 102, and its source address is "the global address" of UE 101.

Figure 14:
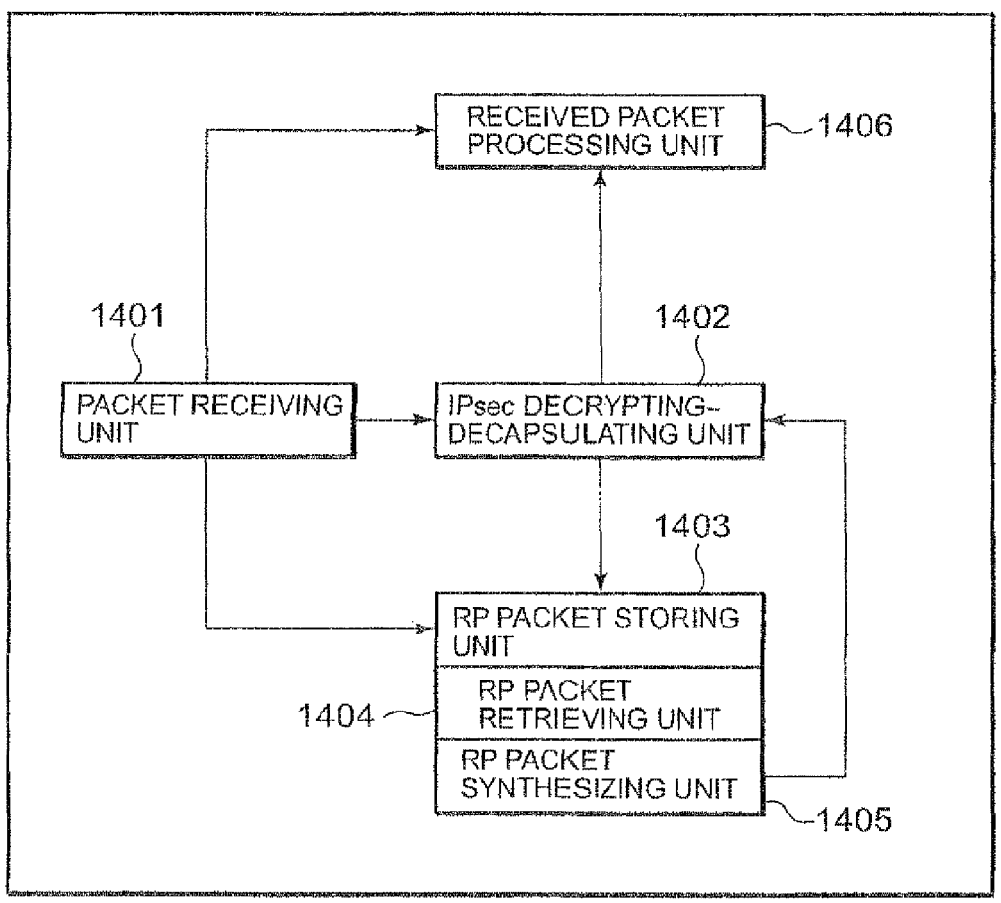
FIG. 14 is a block diagram to show a packet receiving unit of UE of FIG. 1.

Next, referring to FIG. 14, description will be given on a packet receiving unit of UE 102 (and UE 101). The receiving side UE 102 receives a packet at a packet receiving unit 1401. In case it is not a specifically encrypted packet or a packet containing an RP header, the packet is directly delivered to a receiving packet processing unit 1406 and the receiving processing is conducted. When the receiving side UE 102 receives the first packet 404, the first packet 404 contains the first RP header 404b, and it is delivered to an RP packet storing unit 1403. At an RP packet retrieving unit 1404, it is checked whether a packet having the same RP-ID is present or not. If it is present, two packets are synthesized at an RP packet synthesizing unit 1405. When the receiving side UE 102 receives the second packet 1009, decrypting and decapsulating are carried out at the IPsec decrypting-decapsulating unit 1402 because it is a packet encrypted by ACGW 105. Because the second RP header 406b is contained in the decrypted packet 406, it is delivered to the RP packet storing unit 1403. In case "the UE-UE direct communication" is not performed, and if the encrypted packet 402 from ACGW 105 is received, the packet 401 decrypted at the IPsec decrypting-decapsulating unit 1402 is delivered to the receiving packet processing unit 1406.

The receiving side 102 receives the first packet 404 and stores it in the RP packet storing unit 1403. Also, it receives the second packet 1009 and performs processing on it at the IPsec decrypting-decapsulating unit 1402 and stores the second packet 406 containing the second RP header 406b in the RP packet storing unit 1403. When a packet containing the same RP-ID is retrieved at the RP packet retrieving unit 1404, there are packets, which have the same RP-ID. Then, the first packet 404 and the second packet 406 are synthesized at the RP packet synthesizing unit 1405. More concretely, the data portion of the second packet 406 is overwritten at the foremost position of the first RP header 404b of the first packet 404. Also, information on the "Next Header" contained in the second RP header 406b is set up at the "Next Header" in the IP header 404a of the first packet 404. By this synthesizing processing, the initial packet 402 as generated by the transmitting side UE 101 and addressed to UE 102 is restored. In case the synthesized packet 402 contains the ESP header 402b, the receiving side UE 102 delivers the synthesized packet 402 to the IPsec decrypting-decapsulating unit 1402. The receiving side UE 102 decrypts and decapsulates the packet 402 and acquires the packet 401, and this packet 401 is delivered to the receiving packet processing unit 1406.

Termination of the UE-UE Direct Communication>

Now, description will be given on operation when "the UE-UE direct communication" is terminated. ACGW 105 gives an instruction to each of UE 101 and UE 102 to terminate "the UE-UE direct communication". Also, a notification is given to E-Node B 103 that "the UE-UE direct communication" has been terminated. "The UE-UE direct communication" is considered to be terminated when each of UE 101 and UE 102 is not connected to the same E-Node B 103 any more or when one of UE 101 or UE 102 or both perform handover to the other E-Node B. Even when UE 101 and UE 102 are not moving, ACGW 105 can terminate the communication at its judgment. For instance, this is a case where the communication of UE 101 and UE 102 has to be monitored from the reason such as lawful interception.

When an instruction is given from ACGW 105 to terminate "the UE-UE direct communication", UE 101 and UE 102 stop the processing to divide and synthesize the packet, and it is changed over to "a method to transmit all data of the packet to ACGW 105 and to receive all data from ACGW 105". When the termination of "the UE-UE direct communication" is notified from ACGW 105, E-Node B 103 stops the processing to directly transfer the packet from UE 101 to UE 102.

In the present specification, detailed description has been given on a method to divide the packet 402 after the transmitting side UE 101 has encrypted the packet 401 to UE 102 and to divide the packet 402, while it is also possible to carry out the division processing on the packet 402 without performing the encryption of the packet 401.

The Second Embodiment

The mode of implementation as described above is defined as the first embodiment, and description will be given now on a second embodiment.

The following are points (1) and (2) of "the UE-UE direct communication" of the second embodiment.

(1) UE 101 encrypts a packet and transmits it to the correspondent UE 102. The encrypted packet (a first packet) is sent via a route passing through E-Node B 103 (not via ACGW 105) to UE 102. In this case, a key necessary for decrypting the encrypted packet is transmitted to UE 102 via ACGW 105 (a second packet). The key data has less data amount, and it is possible to reduce the data amount to be sent both ways between. E-Node B 103 and ACGW 105.

(Variation of Matching of the Packet to the Key)

The matching of the packet to the key is set to: 1:1. That is, as many keys as the number of packets are transmitted.

The matching of the packet to the key is set to: N:1. That is, the same key is used for each of "N" packets during a certain fixed period. For instance, the key is changed for every 100 packets. As another example, the keys are changed for every 10 minutes. Which of these cases is to be used on the receiving side for decrypting is determined by the value of SPI when IPsec is used for the encryption. In case that the keys are changed according to the number of the packets ("N"), in order to avoid trouble caused by out of synchronization for counting the packets, a counter is placed on each packet to indicate the order of the packet. When the keys are changed according to the time, it is necessary to have synchronization of time between the transmitting side and the receiving side. Also, it would be necessary to determine the time required until the arrival of the packet. In such a case, the time to transmit by the transmitting side may be put on each packet.

(Variation of the Method to Determine the Key)

ACGW 105 decides the key, and the decision is notified to the transmitting side UE 101 and the receiving side UE 102.

ACGW 105 distributes the keys by using an encryption pass for "the transmitting side UE 101-ACGW 105" and an encryption pass for "the receiving side UE 102-ACGW 105". In this case, SPI information is also transmitted together with the keys. This SPI information is hidden in E-Node B 103 and cannot be seen.

The transmitting side UE 101 decides the key, and the decision is transmitted to the receiving side UE 102 via ACGW 105.

By using the encryption pass of "the transmitting side UE 101-ACGW 105", the key is transmitted from the transmitting side UE 101 to ACGW 105. ACGW 105 holds the key and transfers it to the receiving side UE 102. This key information is encrypted and E-Node B 103 cannot recognize it.

(2) E-Node B 103 periodically copies the packet of the UE-UE direct communication and transfers it (a third packet).

ACGW 105 confirms that the transferred packet can be decrypted.

(Option): In order that ACGW can confirm whether the packet is decrypted or not, information to indicate that the packet has been decrypted is added in advance on the transmitting side UE 101.

When the copy of the packet sent to and from the UE (UE 101 or UE 102) has not reached, ACGW 105 stops the UE-UE direct communication to UE 101 and UE 102 and restores the communication to the initial communication via ACGW 105.

When the packet of the UE-UE direct communication does not reach ACGW 105 from E-Node B 103, it is found that there are fewer passing packets in the UE-UE direct communication. If the amount of the packets in the direct communication is less, it means that the effects to reduce the amount of communication between E-Node B 103 and ACGW 105 are less effective, and there is no need any more to maintain the UE-UE direct communication. For this reason, ACGW 105 stops the UE-UE direct communication and it is returned to the communication via ACGW 105.

(The effect of the second embodiment): Similarly to the case of the first embodiment, by reducing the data amount, which is transmitted between E-Node B 103 and ACGW 105, the network resources of Core Network can be effectively utilized.

Now, description will be given on the details of the second embodiment. Similarly to the case of the first embodiment, the communication between UE 101 and UE 102 is performed at first via ACGW 105. In this case, the route between the transmitting side UE and ACGW 105 and the route between the receiving side UE 102 and ACGW 105 are protected by different IPsec SA respectively. When ACGW 105 detects that the transmitting side UE 101 and the receiving side UE 102 are connected to the same E-Node B 103 and it is in the condition where the UE-UE direct communication can be performed, it is checked whether the transmitting side UE 101 and the receiving side UE 102 have capability for the UE-UE direct communication via the route to and from E-Node B 103 or not. In case both of UE 101 and UE 102 have the capability, it is indicated for each of them to establish direct IPsec SA between UE 101 and UE 102. To E-Node B 103, it is notified that the UE-UE direct communication has been permitted to UE 101 and UE 102, and it is indicated to perform the communication via the route passing through E-Node B 103.

Using SA information as notified from ACGW 105, UE 101 and UE 102 start the UE-UE direct communication. After the UE-UE direct communication has been started, SA between UE 101 and ACGW 105 and SA between UE 102 and ACGW 105 are maintained without change. This SA is also used thereafter because the communication between UE 101 or UE 102 and ACGW 105 is continued. For instance, the key data to decrypt the packet is used for the transmission between UE 101 or UE 102 and ACGW 105.

Description will be given below on a case where the packet is transmitted from UE 101 to UE 102 in the second embodiment. UE 101 generates a packet to be transmitted to UE 102, and this is encrypted by IPsec. UE 101 transmits this encrypted packet to UE 102 via the route passing through E-Node B 103. Using the key data received from ACGW 105, UE 102 decrypts the data from UE 101 and performs the receiving processing. E-Node B 103 transfers the packet of the direct communication directly to the correspondents UE 102 and UE 101 respectively without transmitting the packet to ACGW 105. Also, for the purpose of checking the communication between UE 101 and UE 102, E-Node B 103 periodically copies the packet of the direct communication between UE 101 and UE 102 and transfers it to ACGW 105 so that ACGW 105 can check the communication between UE 101 and UE 102.

When the copy of the packet of the direct communication between UE 101 and UE 102 is transmitted from E-Node B 103, ACGW 105 confirms whether the packet can be decrypted by using the stored key or not. If the packet cannot be decrypted, an instruction is given to each of UE 101, UE 102 and E-Node B 103 to stop the direct communication via the route passing through E-Node B 103, and it is switched over to the communication via ACGW 105.

The key for the UE-UE direct communication between UE 101 and UE 102 is periodically updated by the transmitting side UE (UE 101). The time interval of the updating of the key by the transmitting side UE 101 is about several minutes. The time interval of the updating may be several hours or several days. Also, the key may be updated for every packet. When the key is updated by the transmitting side UE 101, the transmitting side UE 101 generates a new key. UE 101 transmits this key data and security parameters index (SPI) to ACGW 105. The key to be transmitted by UE 101 is a key with the data newly updated and prepared. SPI is a type of information, according to which the receiving side can find the key to be used. When the key data is received from UE 101, ACGW 105 stores the key data in a key storing unit. The reason for this is that, when a copy of the packet for the direct communication between UE 101 and UE 102 has been transmitted from E-Node B 103, ACGW 105 can confirm whether it can be actually decrypted or not. Similarly to the case of UE 102, the key data and SPI are stored.

ACGW 105 transfers the key data received from UE 101 to UE 102. UE 102 receives the key data transmitted from UE 101 via ACGW 105. UE 102 stores the received key data so that it can be decrypted when the encrypted packet reaches from UE 101. UE 102 sends a receiving response to ACGW 105. When the receiving response from UE 102 is received, ACGW 105 sends the receiving response to UE 101. UE 101 receives the receiving response from ACGW 105 and recognizes that UE 102 can correctly decrypt the data when the data encrypted by the new key is transmitted to UE 102 by this receiving response. In case the key is not updated by UE 101, ACGW 105 requests UE 101 to update the key. If the request to update the key is not carried out, an instruction is given to each of UE 101, UE 102 and E-Node B 103 so that it can be switched over from the UE-UE direct communication to the communication via ACGW 105.

Figure 15:
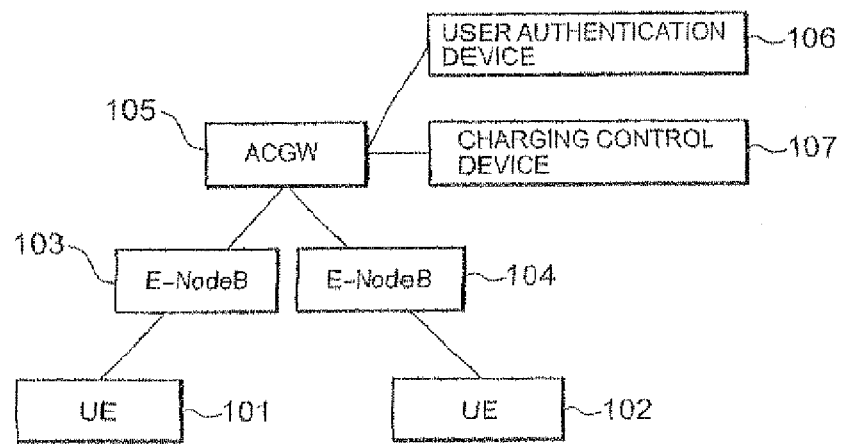
FIG. 15 is a drawing of a system configuration when the transmitting side UE and the receiving side UE are connected to different E-Nodes B respectively.

Now, referring to the attached drawings, detailed description will be given. As shown in FIG. 15, in case UE 101 and UE 102 are connected to different E-Nodes B, i.e. E-Node B 103 and E-Node B 104 respectively, there is no problem even when the communication between UE-UE is carried out via ACGW 105. However, when UE 101 and UE 102 are connected to the same E-Node B 103 as shown in FIG. 1, the same packet may come and go between ACGW 105 and E-Node B 103, and the network resources are consumed uselessly. Thus, in case both of UE 101 and UE 102 are connected to the same E-Node B 103, ACGW 105 sends an inquiry to each of UE 101 and UE 102 as to whether it matches the condition of the UE-UE direct communication. If both of UE 101 and UE 102 match the condition of the communication, an instruction is given to each of UE 101 and UE 102 to perform the UE-UE direct communication and also notifies E-Node B 103 that the UE-UE direct communication has been permitted. Up to this point, the procedure is the same as that of the first embodiment (see FIG. 2, FIG. 3A and FIG. 3B).

Figure 16:
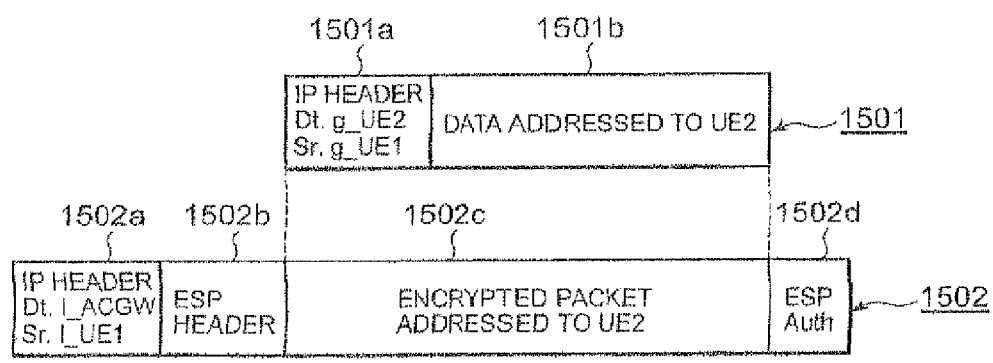
FIG. 16 is a drawing to show a configuration of a packet when the transmitting side UE Sends a packet addressed to the receiving side UE via ACGW.

In case UE 101 and UE 102 perform the communication via ACGW 105, as shown in FIG. 16, the destination address is the address of UE 102 (global address) in a packet 1501 transmitted from UE 101 to UE 102. In order to transmit the packet 1501 addressed to UE 102 to ACGW 105, UE 101 encapsulates the packet with a packet 1502 addressed to the local address of ACGW 105 and transmits it to ACGW 105. A data portion 1502c of the packet 1502 addressed to ACGW is encrypted by IPsec.

The destination address of the packet 1501 addressed to UE 102 is the address of UE 102 (global address; g_UE2), and the source address is the address of UE 101 (global address; g_UE1). The packet 1501 addressed to UE 102 is encrypted (1502c in FIG. 16), and an IP header 1502a addressed to ACGW 105, an ESP extended header 1502b and an ESP authentication trailer 1502d are added. For the packet 1502 addressed to ACGW 105, an address may be used, with which communication can be carried out within the region, and it may be a local address. Here, description is given on a case where the local address is used. The destination address of the packet 1502 addressed to ACGW 105 is the local address of ACGW 105 (l_ACGW), and the source address is the local address of UE 102 (l_UE2).

Figure 17:
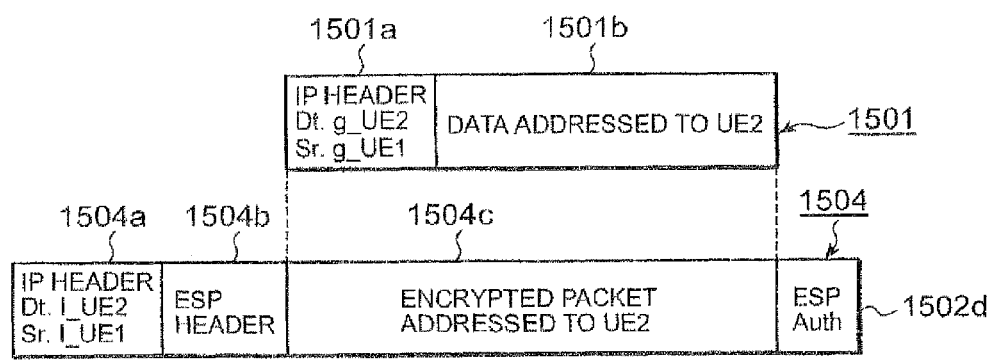
FIG. 17 is a drawing to show a configuration of a packet of the UE-UE direct communication.

A packet 1504 to be transmitted from UE 101 to UE 102 after ACGW 105 gives an instruction to perform the UE-UE direct communication to UE 101 and UE 102 is as shown in FIG. 17. To a data 1501b addressed to UE 102, UE 101 adds a header 1501a, which has the address of UE 102 (global address; g_UE2) as the destination address. This packet 1501 is the same as the packet 1501 sent via ACGW 105 as described above. The packet 1501 addressed to UE 102 is encrypted (1504c in FIG. 17), and an IP header 1504a, an ESP header 1504b and an ESP authentication trailer 1504d are added. The destination address of the IP header 1504a to be added is the local address of UE 102 (l_UE2). This local address of UE 102 is notified to UE 101 via the communication from ACGW 105 to UE 101 and UE 102.

Figure 18:
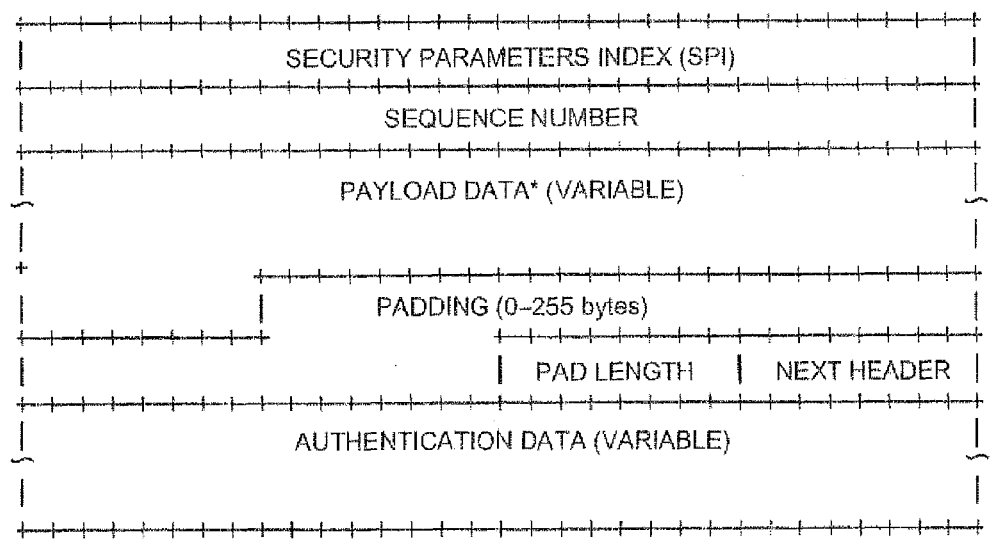
FIG. 18 is a drawing to show the details of a configuration of the packets of FIG. 16 and FIG. 17 respectively.

Packet configuration of IPsec ESP (IETF RFC2406) is shown in FIG. 18. The portions of the security parameters index (SPI) and the sequence number represent the ESP header 1504b. Payload data and padding, pad length, and next header are the encryption data 1504c. Authentication data is ESP Auth. 1504*d*. When the encrypted packet 1504 of the IPsec ESP is received, UE can identify a key necessary for decrypting by using the destination address, the source address and SPI. Also, by incrementing the sequence number one by one for each transfer packet, the number of the transfer packets can be identified.

In a concrete example of the second embodiment, the transmitting side UE periodically updates the key. When bi-directional communication is performed in the UE-UE direct communication, both UEs must update the keys respectively. Here, description will be given by taking an example on a case where UE 101 updates the key as the transmitting side. UE 101 updates the keys at a fixed time interval. The time interval to update the keys may be set to an interval when the number of the transmitted packets 1504 exceeds a certain fixed number. Or, the keys may be updated for every packet 1504. If the keys are not updated for a period longer than the fixed time period, ACGW 105 requests the updating of the keys to UE 101. In case the keys are not updated after the request to update the keys has been given from ACGW 105, ACGW 105 may instruct the stopping of the UE-UE direct communication or to switchover the communication to the communication via ACGW 105.

When UE 101 updates the key, UE 101 transmits a new key in the same manner as the packets 1501 and 1502 as shown in FIG. 16. A type of information transmitted by UE 101 as key data is the key data and the security parameters index (SPI). In addition to this information, other types of information such as encryption mode may be included. The key data prepared by UE 101 is transported by the packet 1501 addressed to ACGW 105. This packet 1501 is encapsulated and encrypted as the packet 1502 addressed to ACGW 105. In the packets 1501 and 1502 to transport the key data, an extended header may be added, which indicates that the key data is being transported. In case the extended header, which indicates that the key data is contained, is included, the processing of ACGW 105 to identify the key data is expedited, and the time period required until the acquisition and the holding of the key data can be reduced. Similarly, in case the extended header is included, which indicates that the key data is also contained in the packet 1501 addressed to UE 101, the processing of UE 102 to identify the key data is speeded up, and the time period required until the key data is acquired and held can be reduced.

Next, description will be given on operation of E-Node B 103. When UE 101 and UE 102 are performing the communication via ACGW 105, it is in the ordinary state. Basically, E-Node B 103 transmits a packet from ACGW 105 to UE 101 and UE 102, and the packets from UE 101 and UE 102 are transmitted to ACGW 105. It does not happen that the packets from UE 101 and UE 102 are transferred to UE 102 and UE 101 respectively. The communication between UE and UE is sent via a route passing through E-Node B 103 and does not pass through ACGW 150. The network side cannot identify how the packet is sent between UE and UE. Even when it becomes necessary to perform lawful interception, the packet cannot be intercepted or picked up. For this reason, when the communication packet between UE-UE is sent via a route to pass through E-Node B 103, it is necessary to limit it to the case where the communication is permitted by ACGW 105. One of the cases where ACGW 105 permits the communication is a case where the packet is sent and returned between E-Node B 103 and ACGW 105 and the network resources are consumed uselessly. For such reason, E-Node B 103 directly transfers the packet without passing through ACGW 105 in case of the communication between UE-UE as instructed from ACGW 105.

The packet 1502, which is prepared by the transmitting side UE and to be transmitted to ACGW 105, has the local address of ACGW 105 (l_ACGW) as the destination address as shown in FIG. 16. On the other hand, the packet 1504 to be transmitted to UE 102 has the local address of UE 102 (l_UE2) as the destination address as shown in FIG. 17. E-Node B 103 identifies whether the packet is a packet 1502 addressed to ACGW 105 based on the local address or it is the packet 1504 addressed to UE. Further, in the case of the packet 1504 addressed to UE, it is checked whether the packet is permitted or not, and only in case the packet is permitted, the packet is transferred to UE 102. In case the UE-UE direct communication is not permitted, the packet is discarded as it is. As the methods other than the discard of the packet, there are: a method to transfer the packet to ACGW 105 and a notification of error is sent from ACGW 105 to UE 101 and UE 102, or a method to give an instruction to switch over to "the communication via ACGW" from ACGW 105. Or, there is a method to transmit a notification of error from E-Node B 103 to UE 101 and UE 102.

E-Node B 103 periodically copies the packet 1504 of the UE-UE direct communication and transfers it to ACGW 105. The time interval to take the copy of the packet 1504 and to transmit it to ACGW 105 is notified from ACGW 105 when an instruction of the UE-UE direct communication is received from ACGW 105. This time interval is designated in term of time. A time period of several minutes may be designated. Or, it may be the time interval longer than this or a time interval shorter than this. Or, it may be designated by the number of the passing packets 1504. Or, ACGW 105 may designate to take a copy every time when 100 packets 1504 pass through and to transfer the copies to ACGW 105. Or, ACGW 105 may designate to take a copy of every packet 1504 and to transfer the copies to ACGW 105. The time interval to take copies and to transfer the copies to ACGW 105 may be changed as necessary by ACGW 105. When the time interval is changed, the same method may be used as the method to notify E-Node B 103 that the UE-UE direct communication is permitted.

Figure 19:
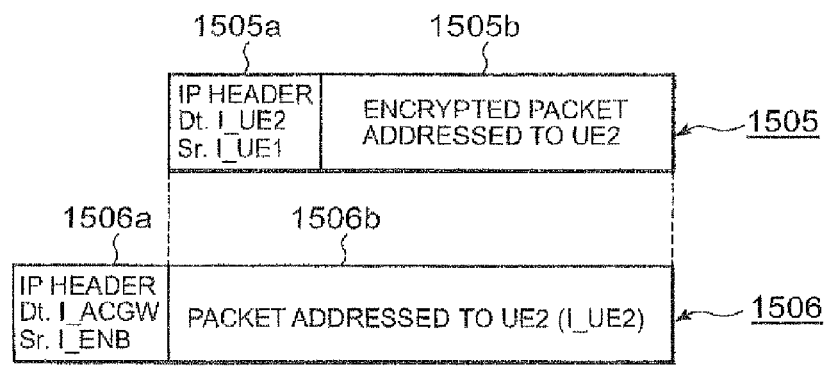
FIG. 19 is a drawing to explain a configuration of a packet when E-Node B sends a packet to ACGW in the UE-UE direct communication in the second embodiment of the invention.

FIG. 19 shows a packet configuration when E-Node B 103 transfers the packets of the UE-UE direct communication to ACGW 105. The packet 1505 to reach E-Node B 103 is a packet, which has the local address of UE 102 (l_UE2) as the destination address (IP header 1505*a*). A data portion 1505 is encrypted so that UE1 102 can decrypt it. This packet 1505 is added with an IP header 1506*a*, which has the local address of ACGW 105 (l_ACGW) as the destination address (packet 1506), and this is transmitted to ACGW 105. There is no need to encrypt the packet 1506, which is transmitted from E-Node B 103 to ACGW 105. However, it may be transferred by encrypting it.

Figure 20:
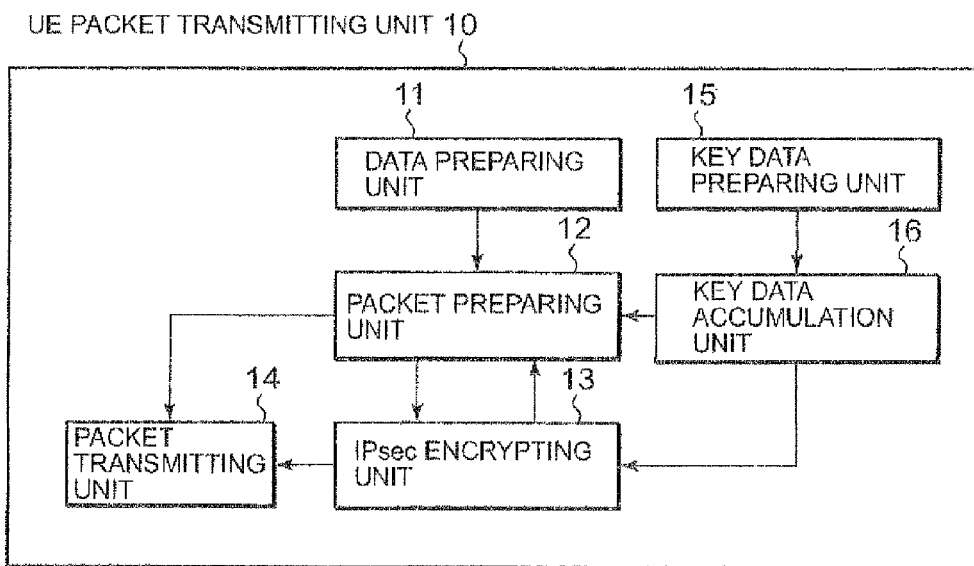
FIG. 20 is a block diagram to show a packet transmitting unit of UE in the second embodiment.

Next, using block diagrams of the device, description will be given on processing operation of each device in the second embodiment. For UE 101 and UE 102, description will be given by dividing to the description on a transmitting unit and the description on a receiving unit respectively. First, referring to FIG. 20, a packet transmitting unit 10 will be described. When the packet is transmitted by UE 101 or UE 102, and in case a packet addressed to ACGW 105 is transmitted, the data prepared by a data preparing unit 11 is turned to a packet addressed to ACGW 105 at a packet preparing unit 12. Then, it is encrypted at an IPsec encrypting unit 13 and addressed to ACGW 105, and the packet is transmitted by a packet transmitting unit 14. As a key data to encrypt the packet addressed to ACGW 105, a data notified from ACGW 105 and stored in a key data accumulation unit 16 is used.

When UE 101 transmits the packet 1501 addressed to UE 102 via ACGW 105, a data 1501*b* addressed to UE 102 is prepared at the data preparing unit 11, and a packet 1501 addressed to UE 102 is prepared at the packet preparing unit 12. This packet 1501 is encapsulated with the packet 1502 addressed to ACGW 105 at the same packet preparing unit 12. Then, it is encrypted to ACGW 105 at the IPsec encrypting unit 13, and it is transmitted from the packet transmitting unit 14. When UE 101 transmits the packet 1503 addressed to UE 102 via the UE-UE direct communication, the data 1501b addressed to UE 102 is prepared at the data preparing unit 11, and the packet 1501 addressed to UE 102 is prepared at the packet preparing unit 12. This packet 1501 is encrypted and addressed to UE 102 at the IPsec encrypting unit 13, and it is transmitted by the packet transmitting unit 14. The key data for encrypting the packet to UE 102 is acquired by the IPsec encrypting unit 13 from the key data accumulation unit 16.

The key data to be transmitted form UE 101 to UE 102 is prepared by the key data preparing unit 15. The key data thus prepared is stored at the key data accumulation unit 16. UE 101 delivers the newly prepared key data to the packet preparing unit 12, and the packet 1501 addressed to UE 102 is generated. Further, at the same packet preparing unit 12, it is encapsulated with the packet 1502 addressed to ACGW 105. It is encapsulated to ACGW 105 at the IPsec encrypting unit 13, and it is transmitted from the packet transmitting unit 14.

Figure 21:
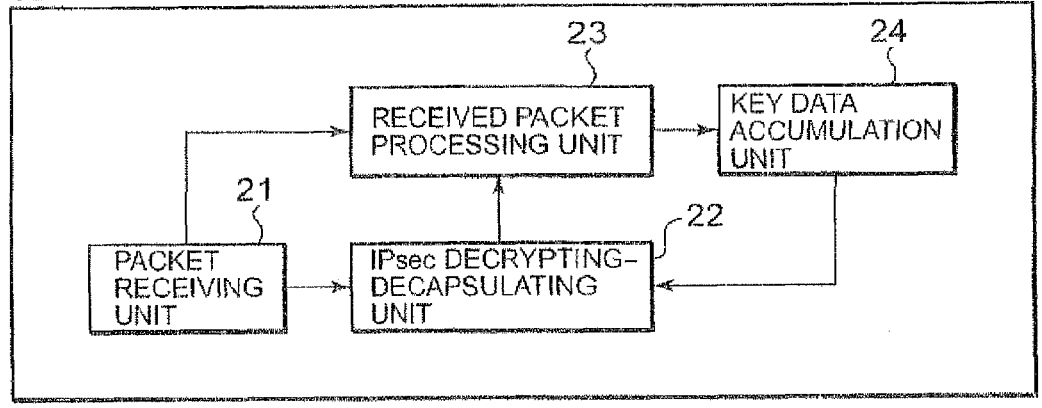
FIG. 21 is a block diagram to show a packet receiving unit of UE in the second embodiment.

Next, referring to FIG. 21, description will be given on a packet receiving unit 20 of UE 101 and UE 102. UE 101 and UE 102 receive the packet at a packet receiving unit 21. In case the packet is encrypted, it is decrypted at an IPsec decrypting-decapsulating unit 22, and it is delivered to a packet processing unit 23. In case the packet is not encrypted, it is delivered from the packet receiving unit 21 to a receiving packet processing unit 23. At the receiving packet processing unit 23, if the key data is transported by the packet, the key data is delivered to a key data accumulation unit 24, and the key data is accumulated. The key data thus accumulated are used for decrypting at the IPsec decrypting-decapsulating unit 22.

Figure 22:
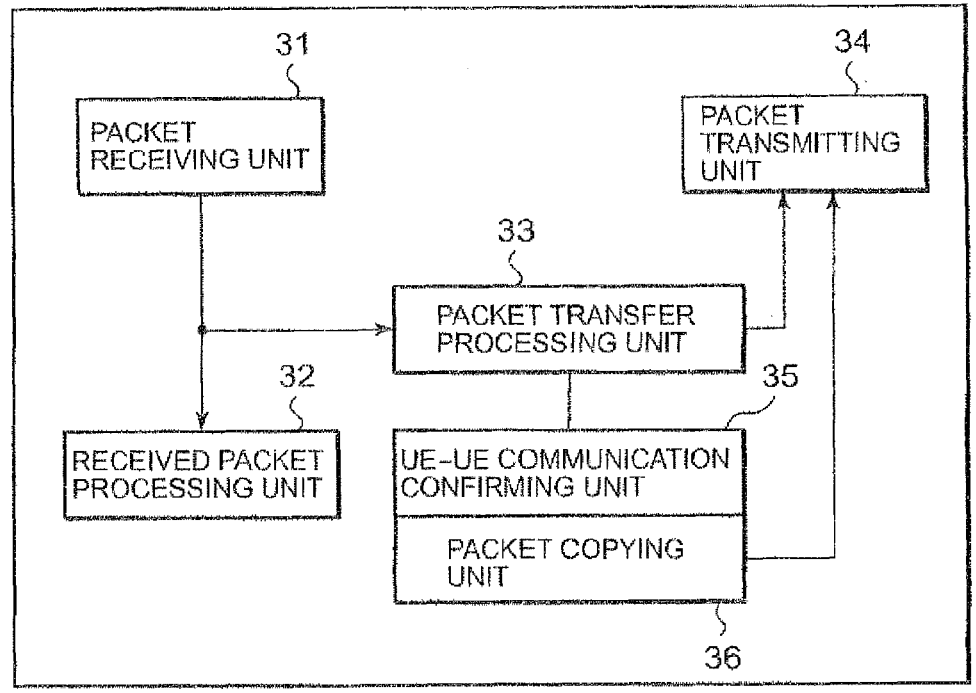
FIG. 22 is a block diagram to show E-Node B in the second embodiment of the invention.

Next, referring to FIG. 22, description will be given on a block diagram of E-Node B 103. E-Node B 103 receives the packet at a packet receiving unit 31. In case the packet is addressed to E-Node B 103, it is processed at a receiving packet processing unit 32. In the packet addressed to E-Node B 103, there is a message to notify the permission of the UE-UE direct communication to be transmitted from ACGW 105. E-Node B 103 transfers and processes the packets other than the packets addressed to E-Node B 103 at a packet transfer processing unit 33. In case it is a packet to be transmitted from UE 101 or UE 102 to ACGW 105, or in case it is a packet to be transmitted from ACGW 105 to UE 101 or UE 102, the packet is transmitted from the packet transmitting unit 34 as it is. In case the packet to be transmitted from UE to UE is transferred, it is confirmed whether the UE-UE direct communication is permitted on the packet or not at an UE-UE communication confirming unit 35, and the packet is transmitted from the packet transmitting unit only when it is permitted. Further, in case the UE-UE direct communication is permitted, the packets of the UE-UE direct communication periodically transmitted from UE are copied by a packet copying unit 36. Then, the copy is put into the packet addressed to ACGW 105, and it is transmitted to ACGW 105 by the packet transmitting unit 34.

Figure 23:
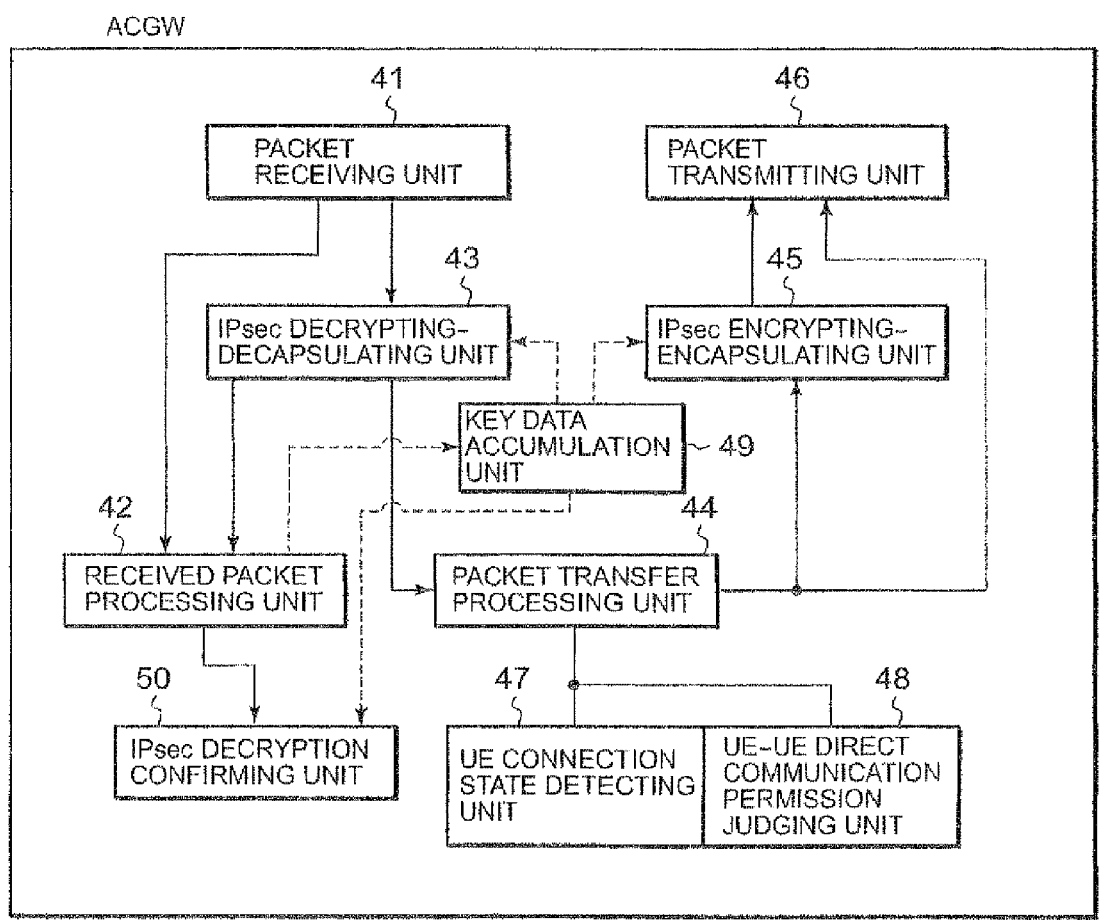
FIG. 23 is a block diagram to show ACGW in the second embodiment of the invention.

Next, referring to FIG. 23, description will be given on a block diagram of ACGW 105. ACGW 105 receives the packet at a packet receiving unit 41. In case the received packet is not encrypted, the receiving processing is performed at a receiving packet processing unit 42. In case the packet is encrypted, it is decrypted at an IPsec decrypting-decapsulating unit 43. If it is a packet addressed to ACGW 105, it is delivered to the receiving packet processing unit 42, and the receiving processing is performed. If it is not addressed to ACGW 105 but it is addressed to the other communication device, it is delivered to a packet transfer processing unit 44. At the packet transfer processing unit 44, if it is necessary to encrypt the packet when it is transferred, the packet is delivered to an IPsec encrypting-capsulating unit 45, and it is transmitted from a packet transmitting unit 46. If it is not necessary to encrypt the packet, it is delivered to the packet transmitting unit 46.

At an UE connecting state detecting unit 47 of the packet transfer unit 44, ACGW 105 confirms whether UE and UE performing the communication with each other are connected to the same E-Node B 103 or not. Also, at an UE-UE direct communication permission judging unit 48, it is confirmed whether amount of the communication between. UE and UE is high or not, and whether lawful interception between UE-UE is needed or not. Also, it is judged whether an instruction to perform the UE-UE direct communication should be given to UE 101 and UE 102 or not.

When the encrypted packet is received or when the encrypted packet is transmitted, ACGW 105 acquires key data from a key data accumulation unit 49. The description of the received packet is performed by an IPsec decrypting-decapsulating unit 43, and the encryption of the transmitting packet is performed by an IPsec encrypting-encapsulating unit 45. When the key data to be used by UE 101 or UE 102 is transmitted from UE 101 or UE 102 respectively, the packet of the key data is received at the packet receiving unit 41. It is then decrypted at the IPsec decrypting-decapsulating unit 43, and the packet is delivered to the received packet processing unit 42. At the received packet processing unit 42, the key data is taken out, and it is stored in the key data accumulation unit 49.

When the packet in the UE-UE direct communication is copied and transmitted from E-Node B 103, it is received by the packet receiving unit 41. The packet in the UE-UE direct communication is taken out by the received packet processing unit 42, and it is confirmed whether or not the decrypting processing can be carried out on this packet by an IPsec decryption processing confirming unit 50. The IPsec decryption processing confirming unit 50 takes out the key data from the key data accumulation unit 49 and performs the decrypting. In the above, description has been given on operations of each of the devices 101, 102, 103 and 105 by referring to the block diagram.

Figure 24:
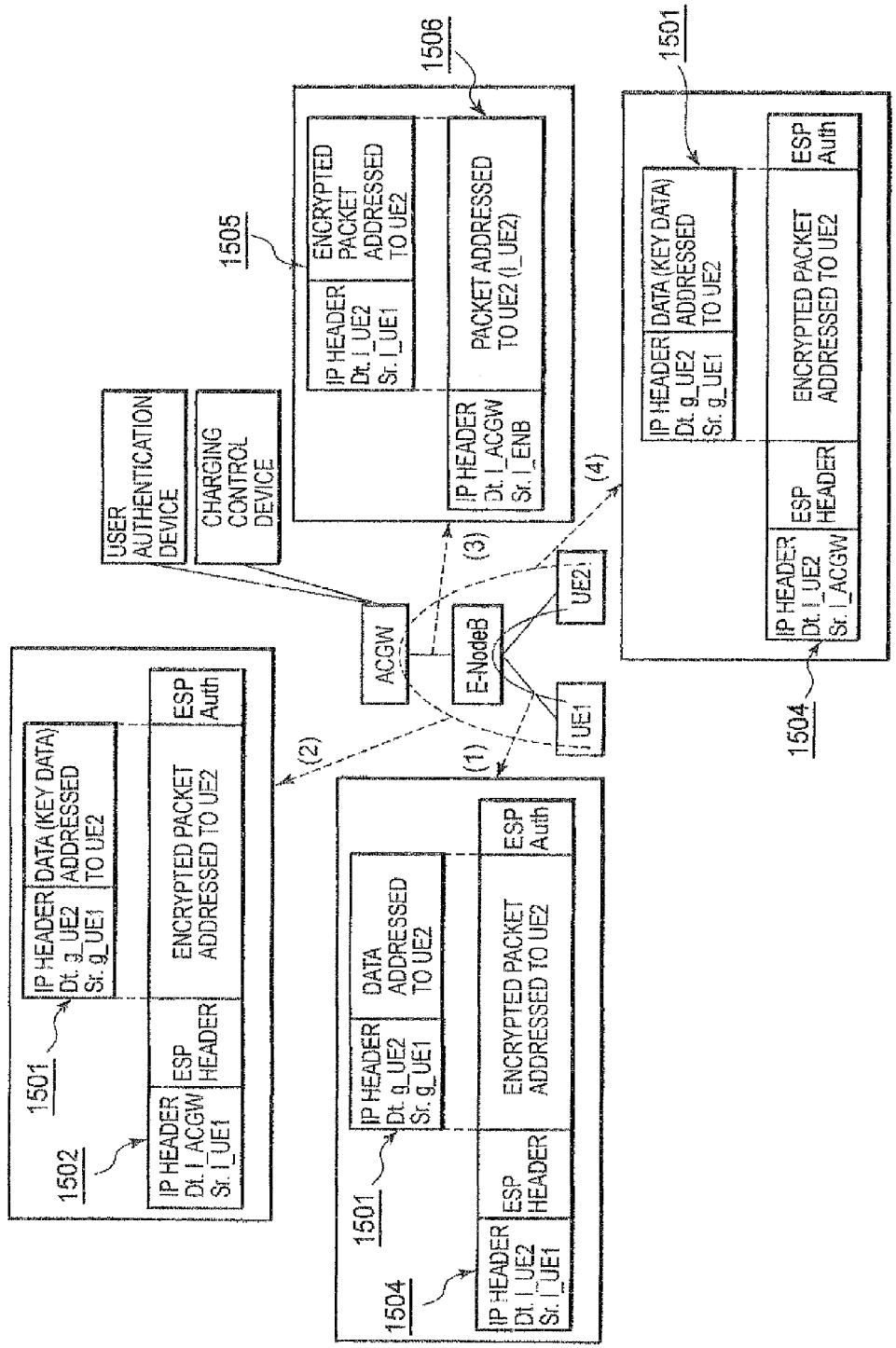
FIG. 24 is a drawing to explain a configuration of each packet in case of the UE-UE direct communication in the second embodiment of the invention.

Next, referring to FIG. 24, description will be given on a packet configuration during the UE-UE direct communication. In the following, description will be given on points (1), (2), (3) and (4) in FIG. 24.

(1) In order to transmit the data addressed to UE2 (UE 102), UE1 (UE 101) prepares a packet 1501 addressed to UE2 (g_UE2). This packet 1501 is encapsulated by a packet 1504 (a first packet of the second embodiment) addressed to UE2 (l_UE2), and it is transmitted. This packet 1504 is transferred to UE2 by E-Node B 103.

(2) In order to transmit the key data to UE2, UE1 prepares a packet 1501 addressed to UE2 (g_UE2). This packet 1501 is encapsulated with a packet 1502 addressed to ACGW (l_ACGW) (a second packet of the second embodiment), and this is transmitted. This packet 1502 is transferred to ACGW 105 by E-Node B 103. Further, this packet is processed at ACGW 105 and is transferred to UE2 as the packet 1504 and the packet 1501 (see FIG. 4).

(3) When E-Node B 103 copies the packet 1505 of the UE-UE direct communication between UE1-UE2 and transmits it to ACGW 105, E-Node B 103 encapsulates the packet 1505 addressed to UE2 (l_UE2) with the packet addressed to ACGW 105 (l_ACGW) (a third packet in the second embodiment), and it is transmitted to ACGW 105. An internal packet 1505 to be encapsulated is the packet 1504 generated in (1) above.

(4) ACGW 105 encapsulates the packet 1501 including the key data addressed to UE2 (g_UE2) with the packet 1504 addressed to UE2 (l_UE2) (a second packet in the second embodiment), and it is transmitted. This packet 1504 is transferred to UE2 by E-Node B 103. The packet 1501 containing the key data addressed to UE2 (g_UE2) is the packet 1501 prepared by UE1 (see (1)).

Figure 25:
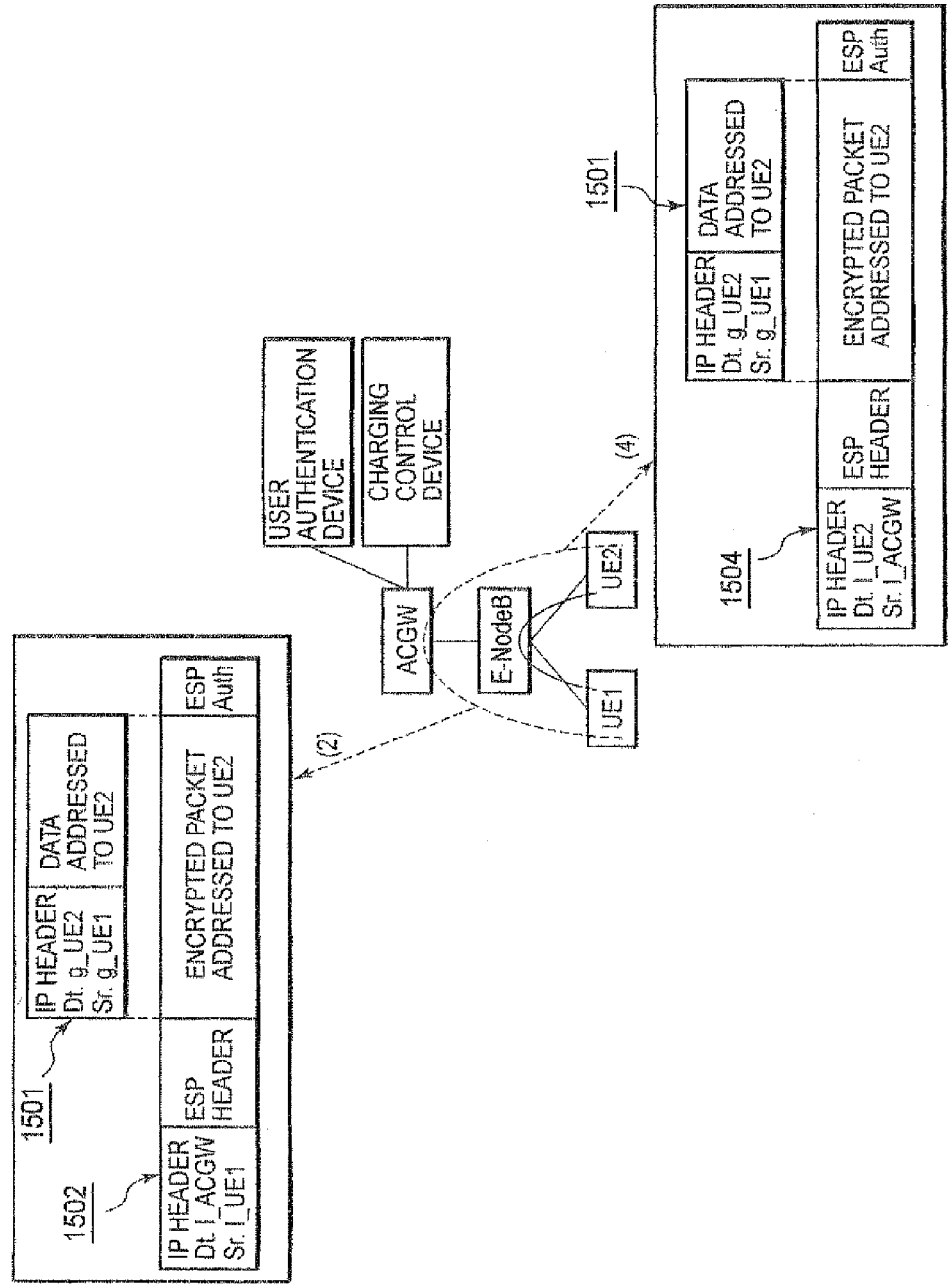
FIG. 25 is a drawing to explain a configuration of each packet in case it is not the UE-UE direct communication in the second embodiment of the invention.

In case it is not the UE-UE direct communication, the communication is performed as shown in FIG. 25. If the same number as the number in the UE-UE direct communication of FIG. 24 is used, UE1 transmits the data to UE2 by using (2) and (4) as described above. In this case, there is no flow of packets as described in (1) and (3).

Figure 26:
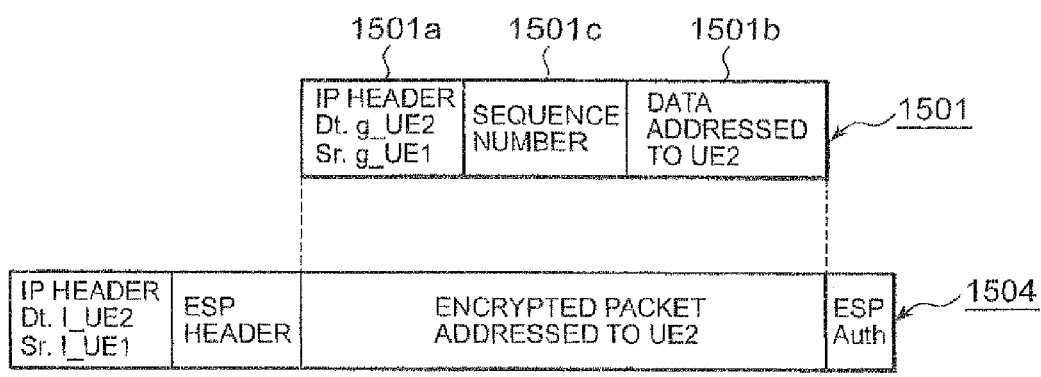
FIG. 26 is a drawing to explain a configuration of a packet when sequence number is put in the second embodiment.

Next, description will be given on a case where the sequence number is put on the communication packet between UE1 and UE2. As the method, by which ACGW 105 identifies the data amount of the UE-UE direct communication between UE1 and UE2, there is a method, according to which the transmitting side puts the sequence number to the communication packet between UE1 and UE2. As shown in FIG. 26, there is a method to place an extended header, which indicates that the sequence number is newly included, between the IP header and the data. FIG. 26 shows an example where an extended header containing the sequence number 1501c is added between the IP header 1501a of the packet 1501 addressed to UE2 (g_UE2) and the data 1501b addressed to UE2. UE1 encapsulates the packet 1501 addressed to UE2 (g_UE2) with the packet 1504 addressed to UE2 (l_UE2), and it is transmitted. Similarly, in case it is transmitted to ACGW 105, the packet 1501 containing this sequence number is encapsulated with the packet addressed to ACGW (l_ACGW), and it is transmitted to ACGW 105. As the methods to put different sequence number, there are: a method to use an undefined region of the IP header, a method to add to a Hop-by-Hop Option extended header as an option, and a method to add a destination option extended header as option.

Figure 27:
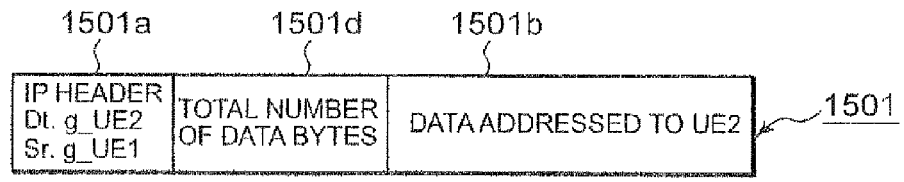
FIG. 27 is a drawing to explain a configuration of a packet when total number of data bytes is put in the second embodiment.

As a method, by which ACGW 105 identifies the number of packets to be transmitted between UE-UE, description has been given in the above on the method, in which UE adds the sequence number 1501c to the packet. According to this method, ACGW 105 can identify the number of the packets 1504 transmitted from UE1 by the number. Also, a method to put total data amount (total number of data bytes 1501d) from the initiation of the communication instead of the sequence number 1501c to the packet 1501 as shown in FIG. 27. Further, there is a method to put both the sequence number 1501c and the total number of data bytes 1501d between the IP header 1501a of the packet 1501 and the data 1501d of the packet 1501 as an extended header.

In the above, description has been given on a method, by which ACGW 105 can identify the sequence number (number of packets) between UE-UE or data amount according to the packets from UE1 and UE2, while still another method may be used, by which a report from E-Node B 103 is received. Also, in the above; description has been given on a method, in which the types of information such as the number of packets, data amount, etc. are added to each packet to be transmitted by UE, while a method may be used, by which information such as the number of packets, data amount, etc. is periodically notified to ACGW by UE.

Figure 28:
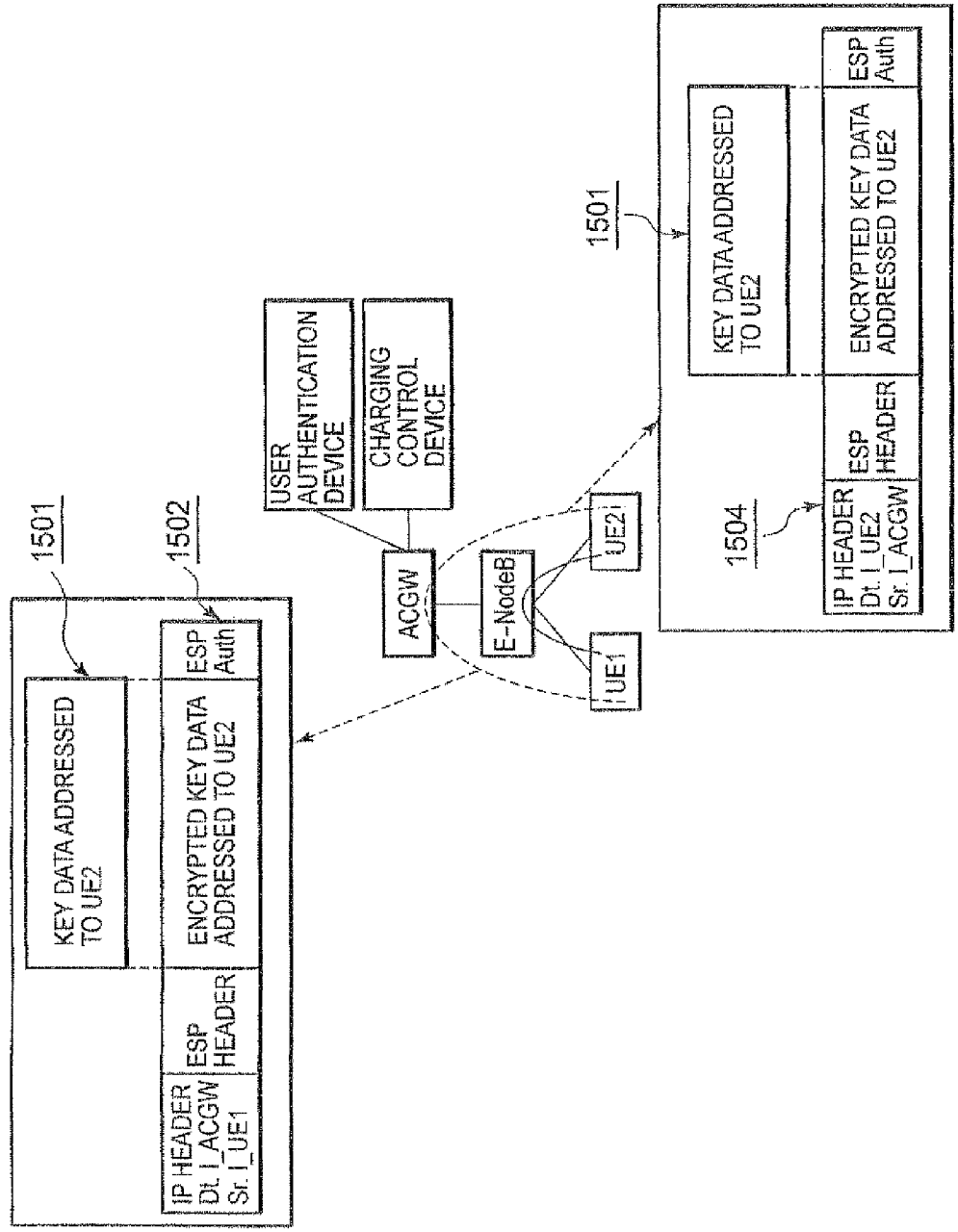
FIG. 28 is a drawing to explain a configuration of a key data transmitting packet at the time of the UE-UE direct communication in the second embodiment of the invention.

Next, referring to FIG. 28, description will be given on a case where the key data is transmitted from UE1 to UE2. When the key data is transmitted to UE2, UE1 prepares a packet 1501 addressed to UE2 (g_UE2). This packet 1501 addressed to UE2 is encapsulated with the packet 1502 addressed to ACGW (l_ACGW), and it is transmitted. ACGW 105 confirms the content of the packet 1501 addressed to UE2. If the key data is contained in it, the key data is acquired and is held.

In order that ACGW 105 and the receiving side UE (UE2) can judge whether the key data is contained in the packet transmitted from UE1 or not, there are following methods:

A number is defined, which indicates that the key data is newly included in protocol number of the IP header. According this method, it can be judged whether the key data is included or not by simply confirming the protocol number of the IP header. As an extension of this method, there is a method to define the extended header, which indicates that the key data is included.

An option for the key data is newly defined for the purpose of transporting the key data using a destination optional extended header. By this method, it can be judged whether the key data is included or not by simply scanning over the destination optional extended header.

Figure 29:
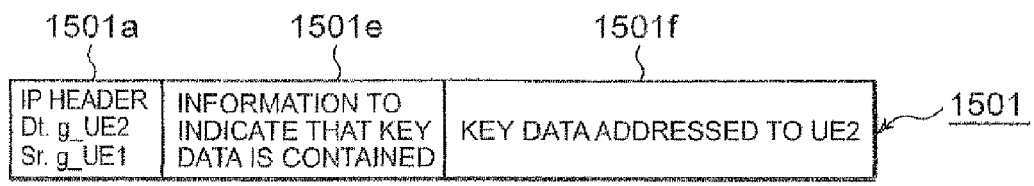
FIG. 29 is a drawing to explain a configuration of a key data transmitting packet at the time of the UE-UE direct communication in the second embodiment of the invention.

General conceptions of these cases are conceptionally shown in FIG. 29. There is information 1501e, which indicates that the key data is included subsequent to the IP header 1501a, and a key data 1501f is included after it. Also, there is a method to transmit the key data by using TCP (Transmission Control Protocol) or UDP (User Datagram Protocol), or a method to perform communication by using ICMP (Internet Control Message Protocol). In such case, ACGW 105 performs the scanning into TCP or UDP, analyzes the message and takes out the key data.

In the above, description has been given on a method, according to which UE1 prepares the packet 1501 to transmit to UE2 for the purpose of transmitting the key data to UE2, and ACGW 105 acquires the key data when the packet 1501 is analyzed. In addition to this method, there is a method, according to which UE1 transmits the key data to ACGW 105 and ACGW 105 transfers it to UE2. In this case, also, the key data is transferred as described above. In the above, description has been given on a method to transmit the key data from UE1 to UE2 via ACGW 105.

<Example of Data Division>

Next, description will be given on an example of data division. As an example of data division, description will be given now on a case where scalable audio coding is used. Scalable audio coding is a coding method to divide the sound into fundamental audio data and data for tone quality improvement at the time of coding of audio data. In the prior art, the Non-Patent Document 3, the Patent Document 1, etc. are known, for instance. In the Non-Patent Document 3, an example is described, in which broad-band sound (~7 kHz) is divided into low frequency signal (~4 kHz) and high frequency signal (4 kHz~7 kHz). Also, in the Patent Document 1, an example is given, in which the sound range is divided into three. By using the scalable audio (sound) coding method, two effects can be obtained. One effect is that, even when the extended data may be lost, the sound can be reproduced if fundamental audio data reaches the receiving side. The other effect is that, even when the extended data may reach, sound cannot be reproduced on the receiving side if the fundamental audio (sound) data does not reach.

On these two effects, it is described in the Non-Patent Document 3 (p. 1108) as follows:

"Even when the coding strings of tone quality guarantee extended codec or high frequency range codec may fall off due to packet loss, audio signal of narrow-band range can be decoded if the coding strings of the core codec have reached, and sound interruption can be prevented. However, if the packet to store the coding strings of the core codec falls off due to packet loss, the sound cannot be reproduced."

Also, in the Patent Document 1 (columns 0017, 0023 and 0025), it is described as follows: "When the data processed by the scalable audio coding is transmitted in packets, the fundamental audio data and the extended data for tone quality improvement are transmitted separately in different packets so that the fundamental audio data may not be lost during communication, and the priority of the packet is increased so that the fundamental audio data may not be lost during communication."

On the other hand, according to the present invention, in the concrete example of the first embodiment and in the variation examples of the first and the second embodiments, the fact that the sound cannot be reproduced if the fundamental audio data is not available is positively utilized. According to the present invention, the transmitted audio data is divided into the fundamental audio data and the extended data or tone quality improvement by the scalable audio coding at the transmitting side UE 101, and the fundamental audio data is transmitted to the receiving side UE 102 via ACGW 105 and the extended data is transmitted via the route passing through E-Node B 103. The receiving side UE 102 cannot reproduce the sound unless the fundamental audio data does not reach via ACGW 105. As the new effects of the present invention, ACGW 105 can perform lawful interception when necessary in order to send the fundamental audio data because the fundamental audio data can be sent via ACGW 105.

<The Important Point>

(1) The transmitting side UE 101 transmits the audio data to the correspondent, i.e. the receiving side UE 102, by using packets. In this case, the audio data is encoded by using scalable audio coding and it is transmitted as packet data. According to the scalable audio coding, the audio data is divided into fundamental audio data and the extended data. The transmitting side UE 101 transmits the fundamental audio data indispensable for sound reproducing via ACGW 105 and the extended audio data for tone quality improvement via the route to and from E-Node B 103. Because the fundamental audio data is less in the amount compared with the case where total audio data is transmitted, it is possible to decrease the data amount sent via the route passing through E-Node B 103 and ACGW 105. Further, as a new effect, even when there is only the fundamental audio data, the sound can be reproduced although tone quality may be deteriorated. Thus, when it is necessary to perform lawful interception at ACGW 105, the lawful interception can be initiated in easier manner.

<Variations of the Packet Transmitting Method to Send Audio Data>

To be applied to a method to divide the contents of the packet (concrete example of the first embodiment)

First, the total audio data including the fundamental audio data and the data for tone quality improvement as processed by the scalable audio coding is placed into one packet. Then, the fundamental audio data and the data for tone quality improvement are divided respectively, and each of these divided data is transmitted via ACGW 105 and via the route to and from E-Node B 103 respectively.

To be applied to a method, in which packets are prepared and transmitted separately (variation examples of the first embodiment and the second embodiment)

The audio data is processed by scalable coding, and the fundamental audio data and the data for tone quality improvement are placed into different packets respectively and are transmitted. Instead of the key data in the second embodiment, a packet with the fundamental audio data is transmitted via ACGW 105 and a packet with the data for tone quality improvement is transmitted via the route to and from E-Node B 103.

Effects

By reducing the amount of the data to be transmitted between E-Node B 103 and ACGW 105, the resources of core network can be effectively utilized. To ACGW 105, only the fundamental audio data processed by scalable audio coding is sent. However, lawful interception can be performed even when there is only the fundamental audio data. Thus, an effect is provided, by which lawful interception can be started in easier manner at ACGW 105 when it is neccessary.

Embodiment

Figure 30:
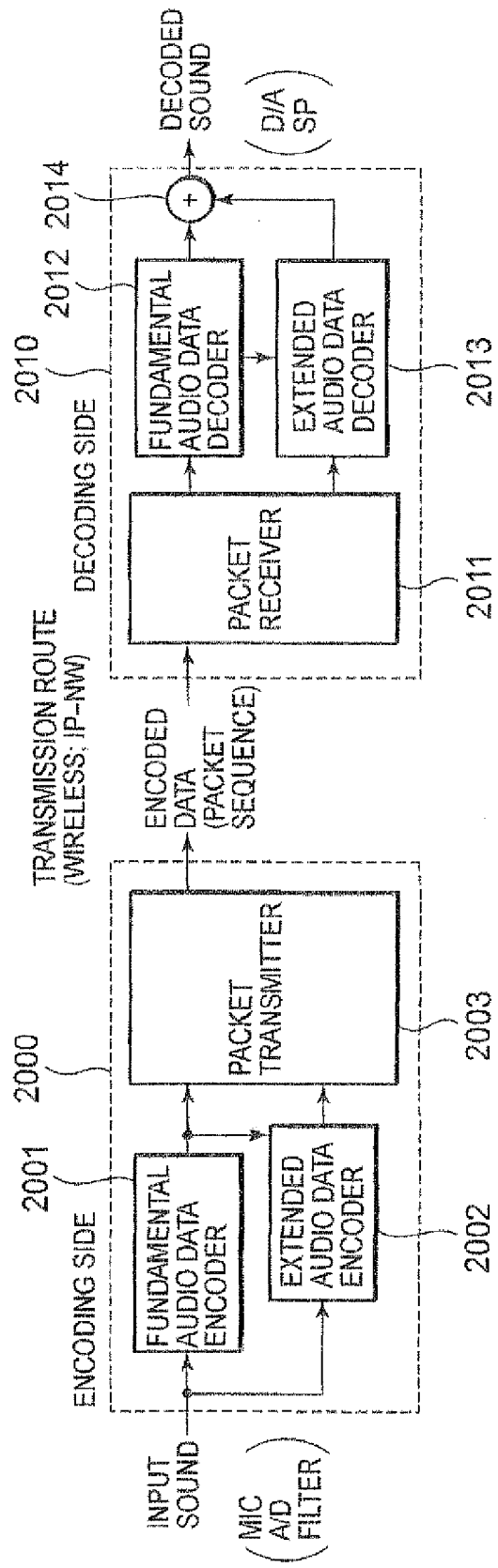
FIG. 30 is a block diagram to show a scalable audio coding device and a decrypting device in a concrete example of the first embodiment and examples of variations of the first and second embodiments.

First, description will be given on a method to divide audio data by using scalable audio coding. Then, description will be given on a method to transmit the audio data by packets. In FIG. 30, a coding device 2000 at a transmitting side communication device encodes the input audio data (PCM data) from a microphone (MIC), an A/D converter, and a band division filter) by scalable audio coding method. By the scalable audio coding method, audio data is encoded at a fundamental audio data encoder 2001 and an extended audio data encoder 2002, and the fundamental audio data and the extended audio data are generated. The fundamental audio data encoder 2001 and the extended audio data encoder 2002 have different sampling frequencies used for coding. Low frequency components are encoded as fundamental audio data, and high frequency components are encoded as extended audio data. By inputting the coding data of the fundamental audio data to the extended audio data encoder 2002, an extended audio data, which is a "difference data" from the fundamental audio data, is generated. The transmitting side communication device prepares packets from the encoded audio data by a packet transmitter 2003, and the packets are transmitted to a receiving side communication device (decoding device 2010). The transmitted packets reach the receiving side communication device via IP network or radio network.

The decoding device 2010 at the receiving side communication device receives the packet at a packet receiver 2011 and delivers the encoded audio data to a fundamental audio data decoder 2012 and an extended audio data decoder 2013 respectively. Upon receipt of the output from the fundamental audio data decoder 2012, the extended audio data is decoded at the extended audio data decoder 2013. The receiving side communication device synthesizes the outputs from the fundamental audio data decoder 2012 and the extended audio data decoder 2013 by an adder 2014, and the decoded sound (PCM data) is reproduced via a D/A converter and a speaker (SP) (not shown).

Next, description will be given on a packet transmitting method of the data, which has been processed by scalable audio coding. There are two packet transmitting methods to transmit the audio encoded data in packets: One is a method to be applied to a procedure, in which the fundamental audio data and the extended data are placed in one packet. In this case, similarly to the first embodiment, the fundamental audio data is cut off from the packet to be transmitted, and the fundamental audio data thus cut off is transmitted via ACGW 105. The other is applied to a procedure, in which the fundamental audio data and the extended data are placed into different packets. In this case, instead of the key data in the second embodiment, a packet with the fundamental audio data is transmitted via ACGW 105.

Figure 31:
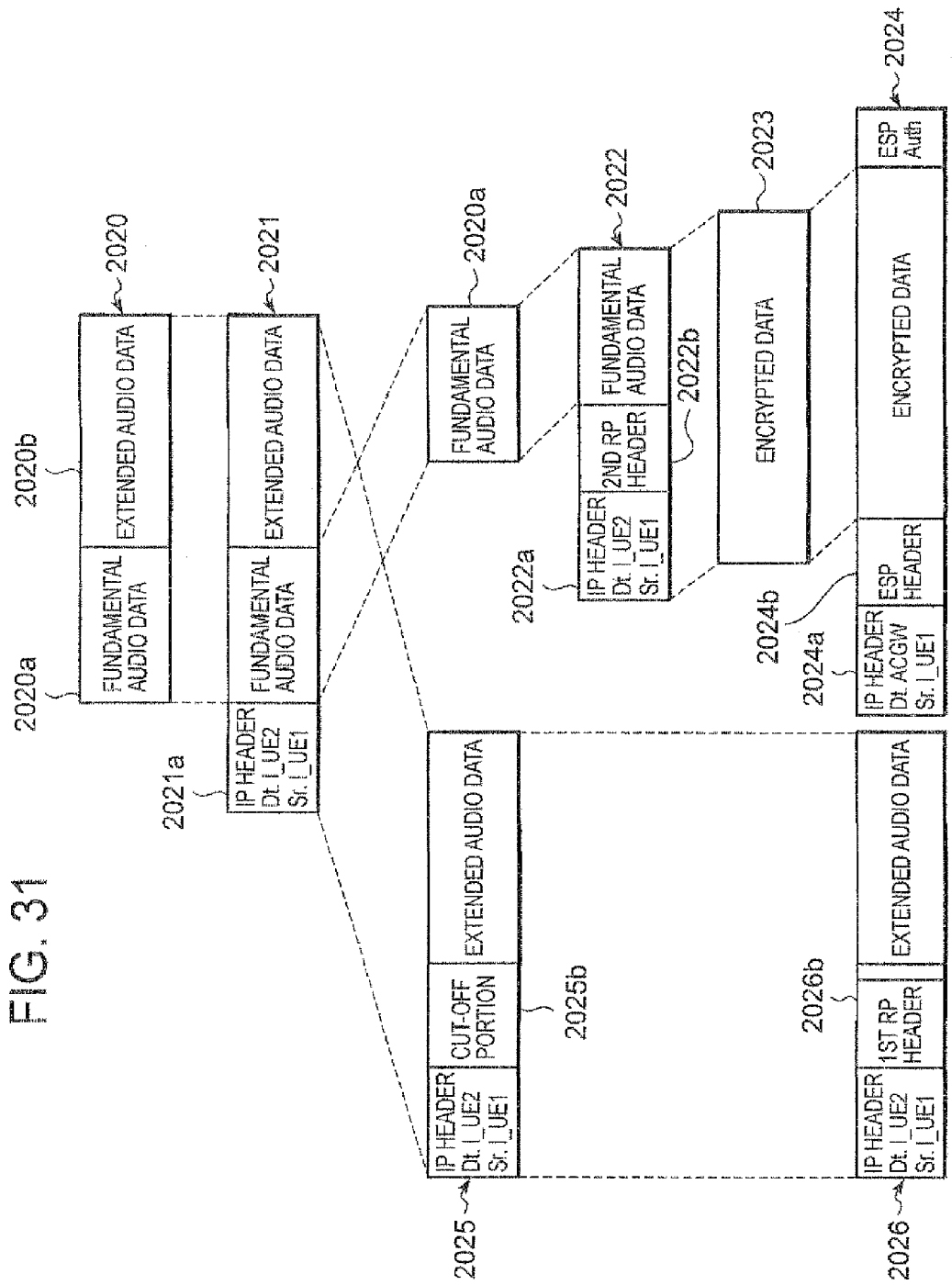
FIG. 31 is a drawing to explain a configuration of a packet in a concrete example in the first embodiment.

First, referring to FIG. 31, description will be given on a method to place the fundamental audio data and the extended data in one packet. To store the audio data 2020 to be transmitted from the transmitting side communication device (UE 101) to the receiving side transmitting device (UE 102) into a packet 2021, an extended audio data 2020b is placed subsequent to the fundamental audio data 2020a as shown in FIG. 31. Destination address of this packet 2021 at an IP header 2021a is UE (local address). The fundamental audio data 2020a is cut off from this packet 2021, and an IP header 2022a and a second RP header 2022b are added to the fundamental audio data 2020a thus cut off. Destination address of the newly added IP header 2022a is UE (local address). The newly generated packet 2022 is encrypted and addressed to ACGW 105 (2023 in FIG. 31), and an IP header 2024a and an IPsec ESP extended header (simply referred as "ESP header" in FIG. 31) 2024b are added. The newly generated packet 2024 is transmitted to ACGW 105, and the packet reaches the receiving side communication device (the receiving side UE 102) via ACGW 105.

On the remaining packet 2025 after the cutting of the fundamental audio data 2020a, a first RP header 2026b is added to the cut-off portion 2025b. This packet is sent via a route to and from the E-Node B 103 and reaches the receiving side communication device (the receiving side UE 102). This packet 2026 containing the extended audio data may not be encrypted because it is not possible to reproduce the sound from the extended audio data alone. In the above, description has been given on an example where the fundamental audio data 2020a is cut off, while the data to be cut off may be all of the fundamental audio data 2020a and a part of the extended audio data 2020b. Although the effects of lawful interception at ACGW 102 cannot be obtained, the cut-off data portion may be only a part of the fundamental audio data 2020a. Even in this case, the effect can be provided that the sound cannot be reproduced unless both of these data are available at the receiving side.

Next, referring to FIG. 32, description will be given on a case where the fundamental audio data 2020a and the extended audio data 2020b are placed in different packets. The transmitting side communication device (the transmitting side UE 101) stores the fundamental audio data 2020a and the extended audio data 2020b into different IP packets 2030 and 2033 respectively. Destination address of each of these IP packets 2030 and 2033 is the transmitting side UE 102 (local address). The packet 2030 containing the fundamental audio data 2020a is encrypted for ACGW 105 (2031 in FIG. 32). Further, an IP header 2032a and an IPsec ESP header (simply referred as "ESP header" in FIG. 32) 2032b are added. The encrypted packet 3032 containing the fundamental audio data 2031 reaches the receiving side UE 102 via ACGW 105. Each of the packets 2033 and 2034 containing the extended audio data 2020b is sent via the route to and from E-Node B 103 and reaches the receiving side UE 102. These packets 2033 and 2034 containing the extended audio data 2020b may not be encrypted. (The packets 2033 and 2034 are the same). This is because the sound cannot be reproduced if there is only the extended audio data 2020b.

Figure 6:
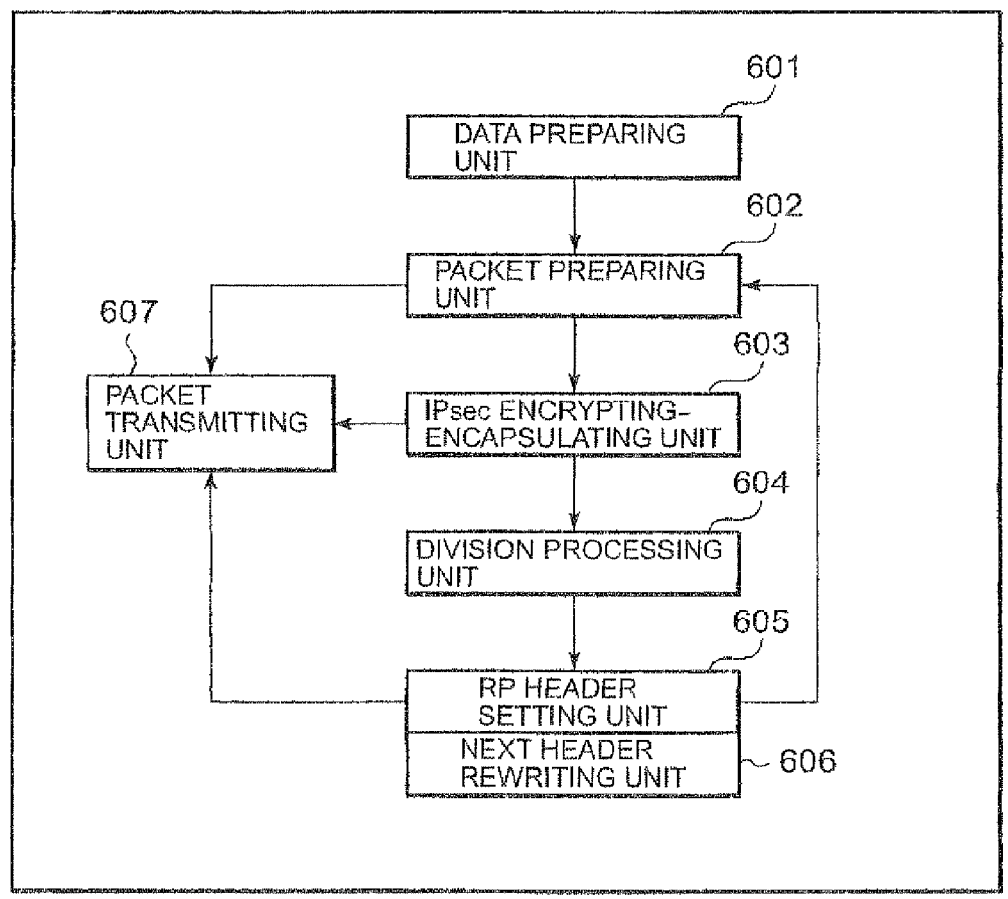
FIG. 6 is a block diagram to show a packet transmitting unit of UE of FIG. 1.

In the configuration of the transmitting units of UE 101 and UE 102, by providing the coding device 2000 as shown in FIG. 30 in the data preparing unit 601 (and the packet preparing unit 602) as shown in FIG. 6, the fundamental audio data 2020a and the extended audio data 2020b can be separately transmitted by the method to transmit by dividing the inner portion of the packet and the method to transmit in individually separated packets. In the configuration of the receiving units of UE 101 and UE 102, by providing the decoding device 2010 shown in FIG. 30 in the received packet processing unit 1406 of FIG. 14, the fundamental audio data 2020a and the extended audio data 2020b divided by the method as given above can be decoded and synthesized. Further, at ACGW 105, sound reproduction processing for lawful interception can be carried out at the packet transfer processing unit 1104 as shown in FIG. 11.

Other Embodiments

The present invention can be applied to a case where not only audio data but also image data are included. For instance, when MPEG2 is used, only in I picture, which is intra-frame coding data, is transmitted via ACGW 105, and P and B pictures, which are inter-frame difference prediction coding data, are transmitted via the route to and from E-Node B 103. When MPEG4 or H.264/AVC is used, only I slice, which is intra-screen production coding data, is transmitted via ACGW 105, and P and B slices, which are inter-screen difference prediction coding data, are transmitted via the route to and from E-Node B 103. Because P and B pictures (P and B slices) are difference data, the receiving side UE 102 cannot decode unless there is I picture (I slice), but I picture (I slice) can decode by itself and ACGW 105 can lawfully intercept. Because it is prescribed in MPEG2 that the foremost frame of 15 frames must be an I picture. Thus, if it is only I picture of the foremost frame, which is transmitted via ACGW 105. Thus, the network resources can be efficiently utilized, and the burden on ACGW 105 can be reduced.

In the embodiments as described above, description has been given by taking an example on ACGW 105 and E-Node B 103 in the 3rd Generation Partnership Project (3GPP®), while the present invention can be applied to the other systems, too. For example, ACGW 105 and E-Node B 103 can be applied to an access controller and an access point in IEEE 802.11 respectively. Also, ACGW 105 and E-Node B 103 can be applied respectively to an access controller in CAPWAP (Control and Provisioning of Wireless Access Points) and in. WTP (Wireless Termination Point).

RFC 4118: "Architecture Taxonomy for Control and Provisioning of Wireless Access Points (CAPWAP)"; http://www.jetf.org/rfc/rfc4118.txt.

In the above, description has been given on a case where UE 101 and UE 102 are connected to the same E-Node B 103, but it is not limited to the E-Node B devices 103, which are physically the same. Even when these are E-Node B devices physically different from each other, this can be applied to a case where the E-Node B devices are logically the same. In such case, the data sent via the route to and from E-Node B can be transmitted to the receiving side UE 102 after it has been transmitted between two or more E-Node B devices. Even in this case, the effects of the present invention to reduce the amount of packet data to be transmitted between E-Node B and ACGW 105 can be equally provided. In the environment where the architecture of the 3rd Generation. Partnership Project and the architecture of the wireless LAN co-exist, a network can be established where E-Node B, Access Point, WTP, etc. are present in mixed state. Even, in such a network, the invention can be applied by limiting to only a part of the data to be transmitted to ACGW or access controller and by sending most of the other data via the route to and from E-Node B, Access Point, and WTP.

Each functional block used in the description of the embodiments as described above can be realized as LSI, which is typically represented by an integrated circuit. These may be manufactured each as one chip or may be produced as one chip including a part or all. Here, it is referred as LSI, while it may be called IC, system LSI, super LSI or ultra LSI, depending on the degree of integration. The technique to use the integrated circuit is not limited to LSI, and it may be realized as a dedicated circuit or a general-purpose processor. After manufacturing LSI, FPGA (Field Programmable Gate Array), which can be programmed, or a reconfigurable processor may be used, in which the connection and the setting of circuit cells inside LSI can be reconfigured. Further, if a new technique of circuit integration to replace LSI may emerge as the result of the progress of the semiconductor technique or other techniques derived from it, the functional block may be integrated by using such technique. For instance, the application of biotechnology is one of such possibilities.

INDUSTRIAL APPLICABILITY

According to the present invention, network resources can be efficiently utilized when radio terminals on the transmitting side and the receiving side are connected to a radio relay device and the burden on the control device can be reduced. Also, the effects can be provided so that the control device can control the communication of radio terminal, and it can be used in the networks such as 3GPP (registered trademark), IEEE 802.11, CAPWAP (Control and Provisioning of Wireless Access Points), etc.

The invention claimed is:

1. A communication terminal for communicating to a corresponding communication terminal connected to a same base station as the communication terminal is connected to, the communication terminal comprising:
   an encrypting unit configured to encrypt a transmission packet;
   a dividing unit configured to divide the transmission packet addressed to the corresponding communication terminal into a first packet to be transmitted via a route not passing through a control device, and a second packet to be transmitted via the control device, the second packet including information which is necessary for decrypting the first packet, the control device managing the communication between the communication terminal and the corresponding communication terminal; and
   a sending unit configured to send the first packet directly to the corresponding communication terminal, and send the second packet to the corresponding communication terminal via the control device.

2. The communication terminal according to claim 1, wherein the communication terminal sends the first packet directly to the corresponding communication terminal using a security association established between the communication terminal and the corresponding communication terminal.

3. The communication terminal according to claim 2, wherein the communication terminal sends key information used for the security association to the corresponding communication terminal via the control device by including the key information in the second packet.

4. A communication terminal for communicating to a corresponding communication terminal connected to a same base station as the communication terminal is connected to, the communication terminal comprising:
   a dividing unit configured to divide a transmission packet addressed to the corresponding communication terminal into a first packet to be transmitted via a route not passing through a control device, and a second packet to be transmitted via the control device, the control device managing the communication between the communication terminal and the corresponding communication terminal; and
   a sending unit configured to send the first packet directly to the corresponding communication terminal, and send the second packet to the corresponding communication terminal via the control device,
   wherein the dividing unit starts dividing the transmission packet when the communication terminal receives, from the control device, an instruction to start a direct communication.

5. The communication terminal according to claim 4, wherein the instruction to start the direct communication includes an address of the corresponding communication terminal.

6. A communication terminal for communicating to a corresponding communication terminal connected to a same base station as the communication terminal is connected to, the communication terminal comprising:
   a dividing unit configured to divide a transmission packet addressed to the corresponding communication terminal into a first packet to be transmitted via a route not passing through a control device, and a second packet to be transmitted via the control device, the control device managing the communication between the communication terminal and the corresponding communication terminal; and
   a sending unit configured to send the first packet directly to the corresponding communication terminal, and send the second packet to the corresponding communication terminal via the control device,
   wherein the dividing unit encrypts the transmission packet, generates the first packet including a remaining data portion after cutting of the encrypted transmission packet, and generates the second packet including a cut-off data portion after the cutting of the encrypted transmission packet.

7. A control device for managing a communication between a communication terminal and a corresponding communication terminal connected to a same base station as the communication terminal is connected to, the control device comprising:
   a receiving unit configured to receive a second packet from the communication terminal via the base station, the communication terminal dividing an encrypted transmission packet addressed to the corresponding communication terminal into a first packet to be transmitted via a route not passing through the control device, and the second packet to be transmitted via the control device the second packet including information which is necessary for decrypting the first packet;
   a sending unit configured to send the second packet to the corresponding communication terminal via the base station; and
   a managing unit configured to manage the communication based on the second packet.

8. The control device according to claim 7, wherein the transmission packet is encrypted and the encrypted transmission packet is divided into the first and second packets by generating the first packet including a remaining data portion after cutting of the encrypted transmission packet and by generating the second packet including a cut-off data portion after the cutting of the encrypted transmission packet.

9. The control device according to claim 7, wherein the managing unit identifies a traffic amount regarding the communication by obtaining information from the second packet.

10. The control device according to claim 7, further comprising a connecting state detecting unit configured to check a connecting state between the communication terminal and the corresponding communication terminal, and send to the communication terminal, an instruction to start a direct communication.

11. The control device according to claim 10, wherein the connecting state detecting unit check the connecting state by sending an inquiry message to each of the communication terminal and the corresponding communication terminal as to whether to have capability for the direct communication, and wherein the connecting state detecting unit sends the instruction to start the direct communication in case of receiving a response message indicating that each of the communication terminal and the corresponding communication terminal has capability for the direct communication as a response to the inquiry message.

12. The control device according to claim 10, wherein the connecting state detecting unit sends, to both the communication terminal and the corresponding communication terminal, instructions to terminate the direct communication when the control device detects that at least one of the communication terminal and the corresponding communication terminal changes a connection to the base station into a connection to another base station.

13. The control device according to claim 7, wherein the managing unit further identifies a traffic amount regarding the communication based on the first packet, the first packet being periodically copied and transferred to the control device by the base station.

14. The control device according to claim 13, wherein the connecting state detecting unit sends, to both the communication terminal and the corresponding communication terminal, instructions to terminate the direct communication when the control device detects that a period of not receiving the first packet from the base station exceeds a certain value.

* * * * *